United States Patent [19]
Rinehuls

[11] 3,822,460
[45] July 9, 1974

[54] APPARATUS FOR AUTOMATICALLY MOUNTING TRANSPARENCIES IN SLIDEMOUNTS

[75] Inventor: Richard A. Rinehuls, Port Crane, N.Y.

[73] Assignee: Seary Manufacturing Co., Endicott, N.Y.

[22] Filed: Sept. 21, 1972

[21] Appl. No.: 291,030

[52] U.S. Cl............................................. 29/211 D
[51] Int. Cl......................................... B23q 7/10
[58] Field of Search.......... 29/211 D, 211 R, 208 D, 29/208 R, 200 B, 200 R; 156/443

[56] References Cited
UNITED STATES PATENTS

| | | | |
|---|---|---|---|
| 2,441,876 | 5/1948 | Fleisch | 29/211 R |
| 3,067,805 | 12/1962 | Flynn | 156/443 |
| 3,274,665 | 9/1966 | Higginson et al. | 29/208 D |
| 3,600,783 | 8/1971 | Krinsky | 29/200 B |

Primary Examiner—Thomas H. Eager
Attorney, Agent, or Firm—Hubbell Cohen & Stiefel

[57] ABSTRACT

Apparatus for automatically mounting transparencies in slidemounts in which the slidemounts and transparencies are simultaneously fed in opposite directions along the same axis to a loading station where they are superimposed, and under which a carriage reciprocates for actuating a cutter, for elevating pusher dogs to engage and push the superimposed transparency and mount to a press, and for subsequently dropping the pusher dogs so that the carriage can move back under the loading station without interference with the newly disposed slidemount and transparency.

17 Claims, 33 Drawing Figures

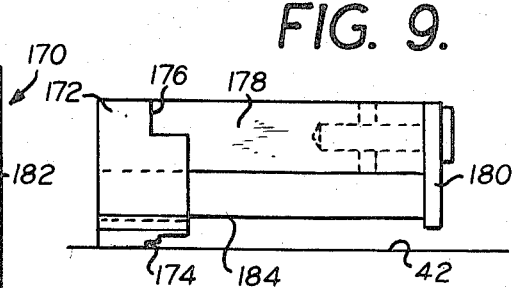
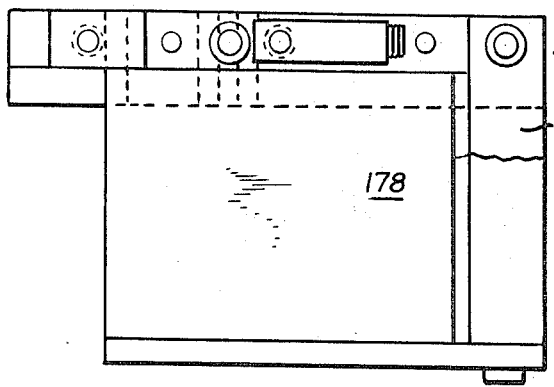
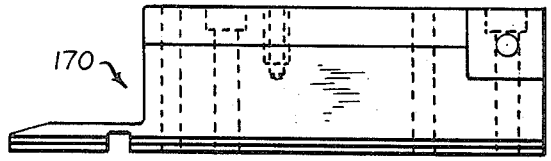
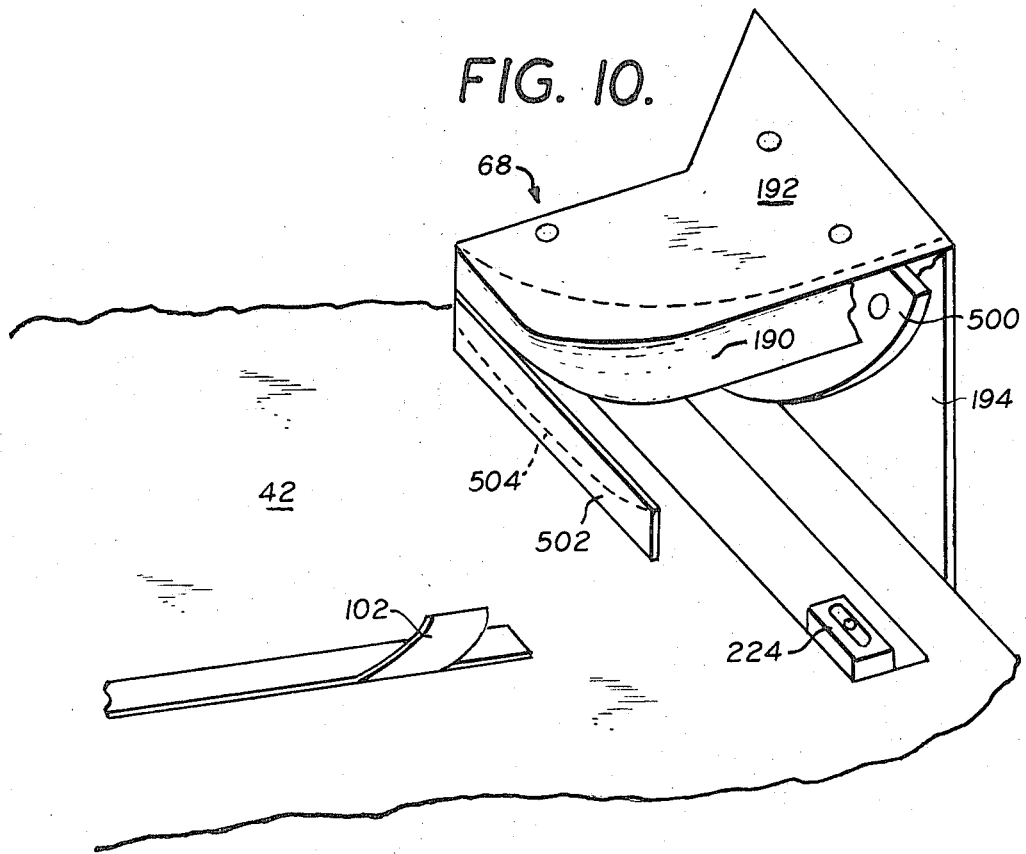

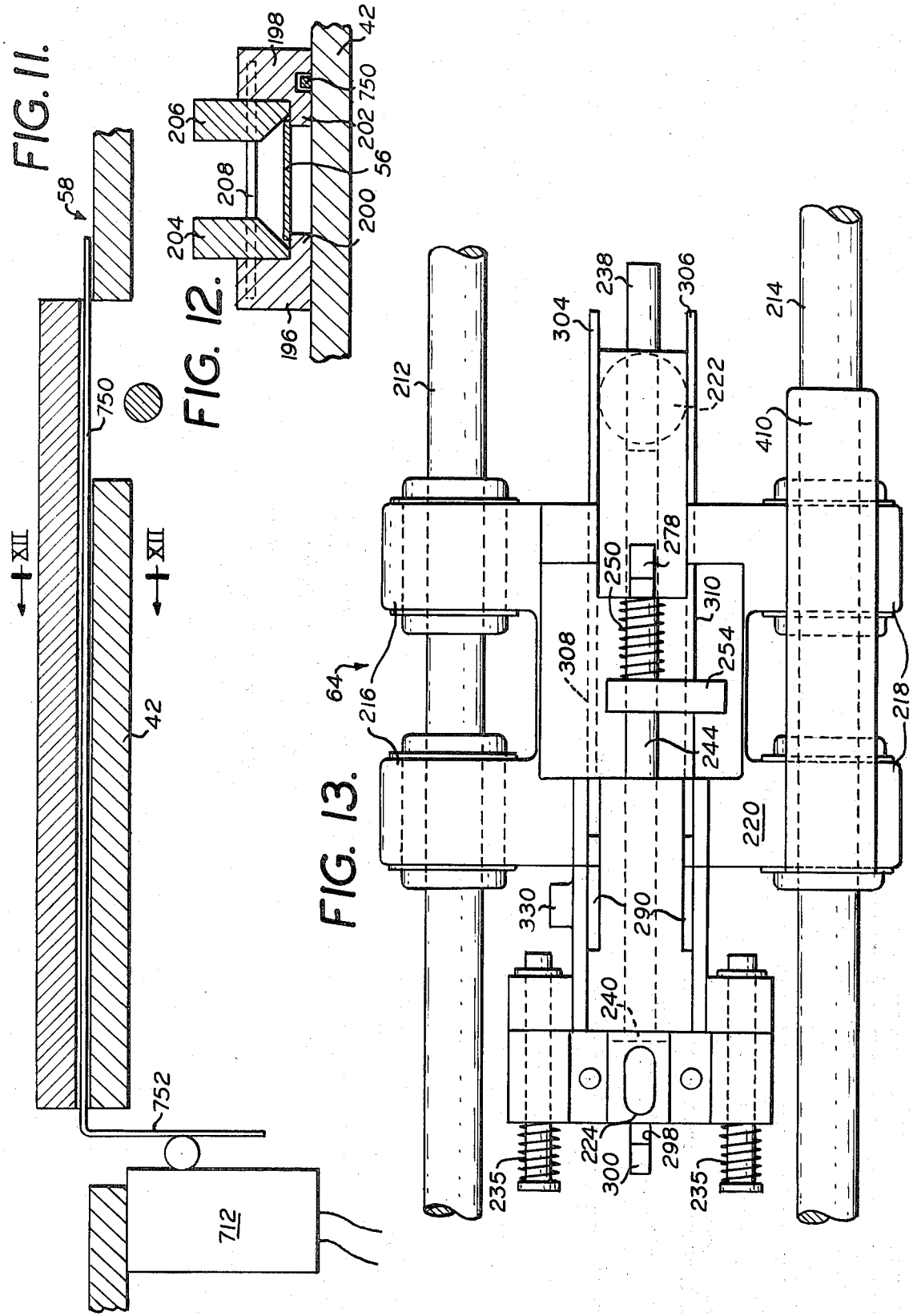

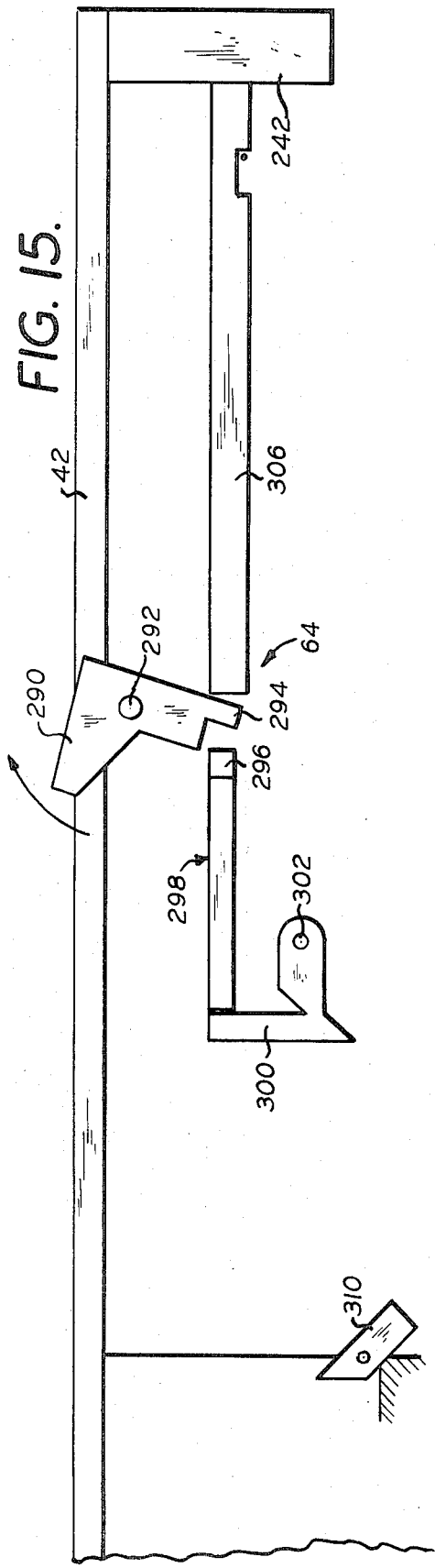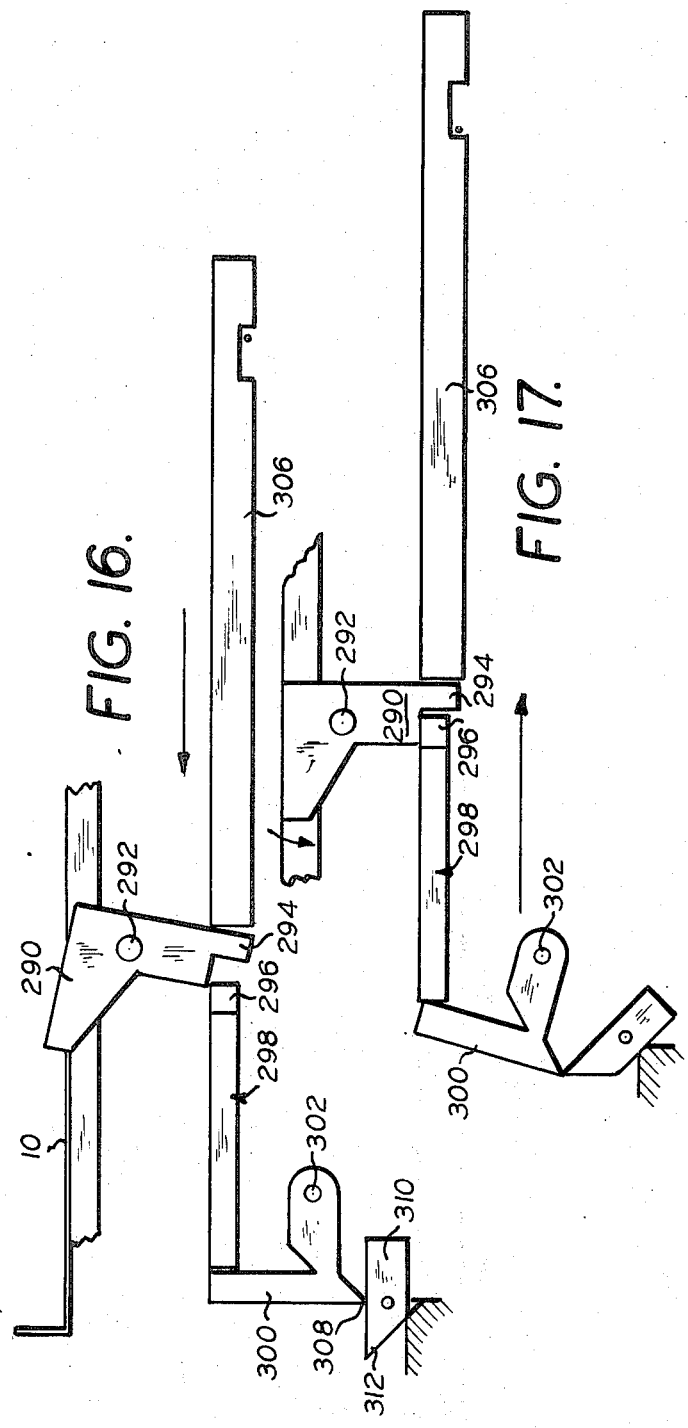

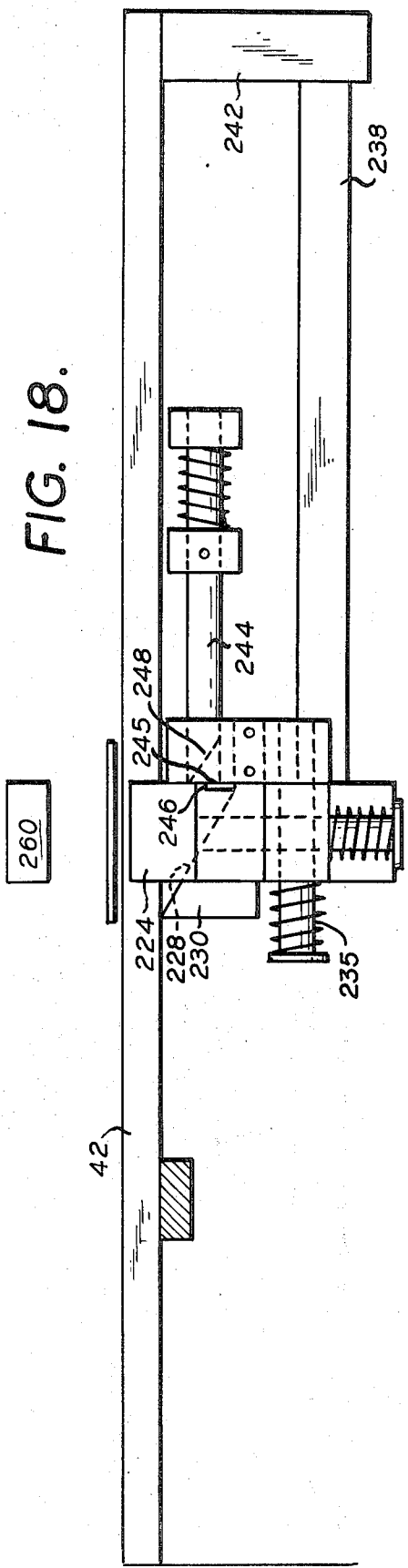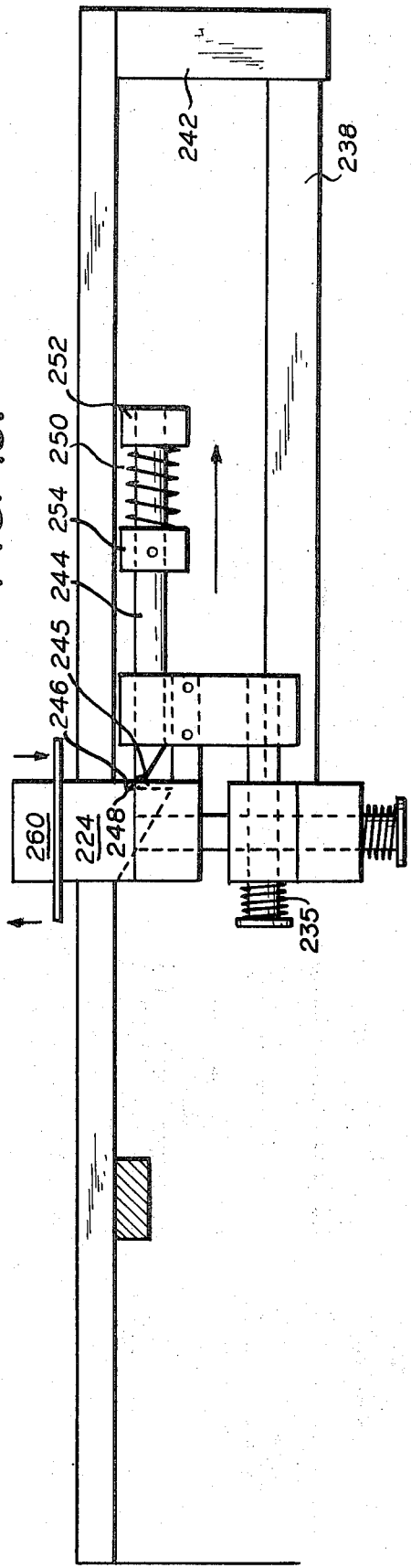

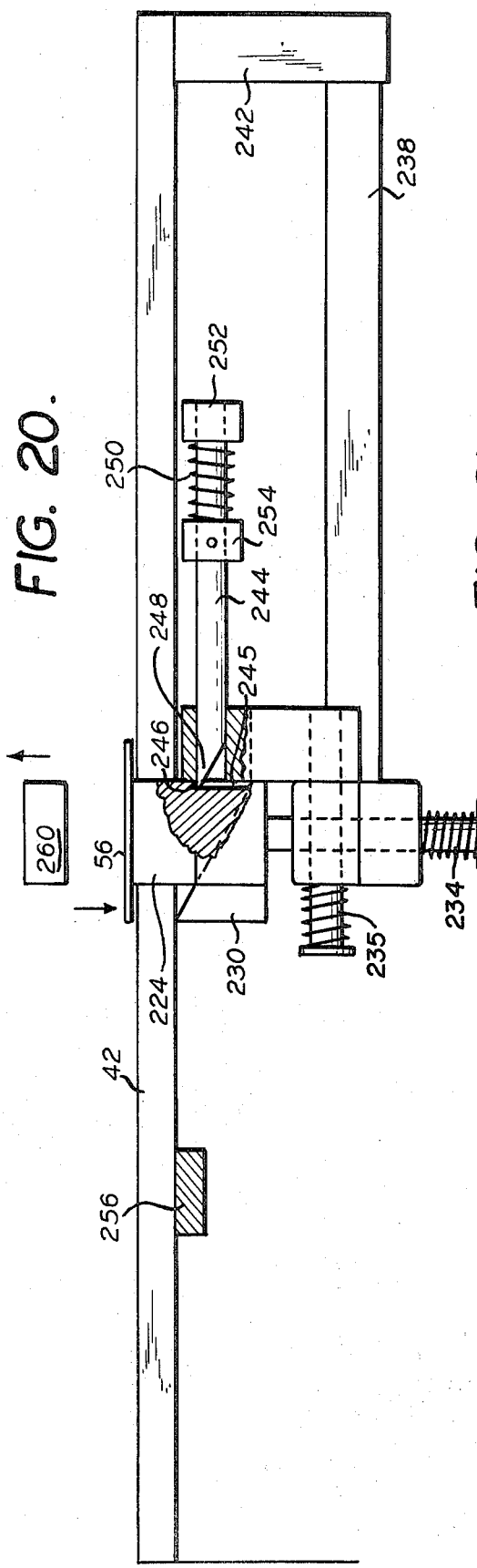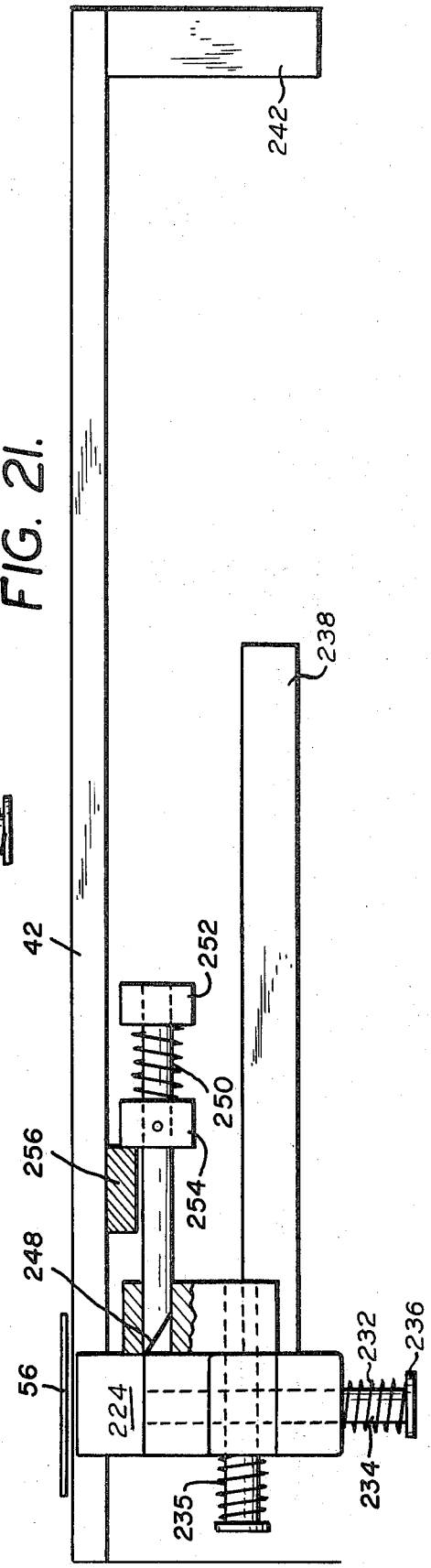

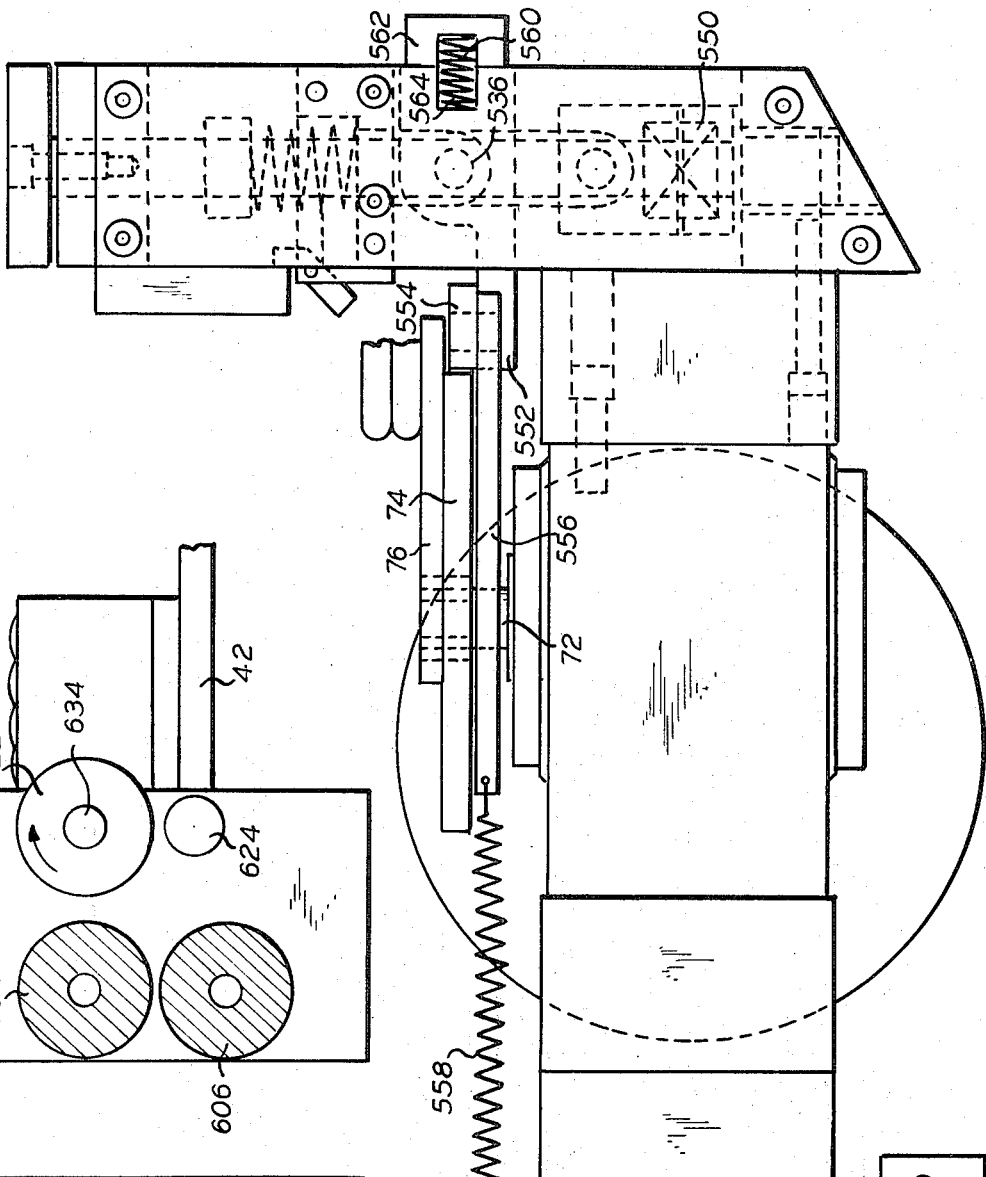

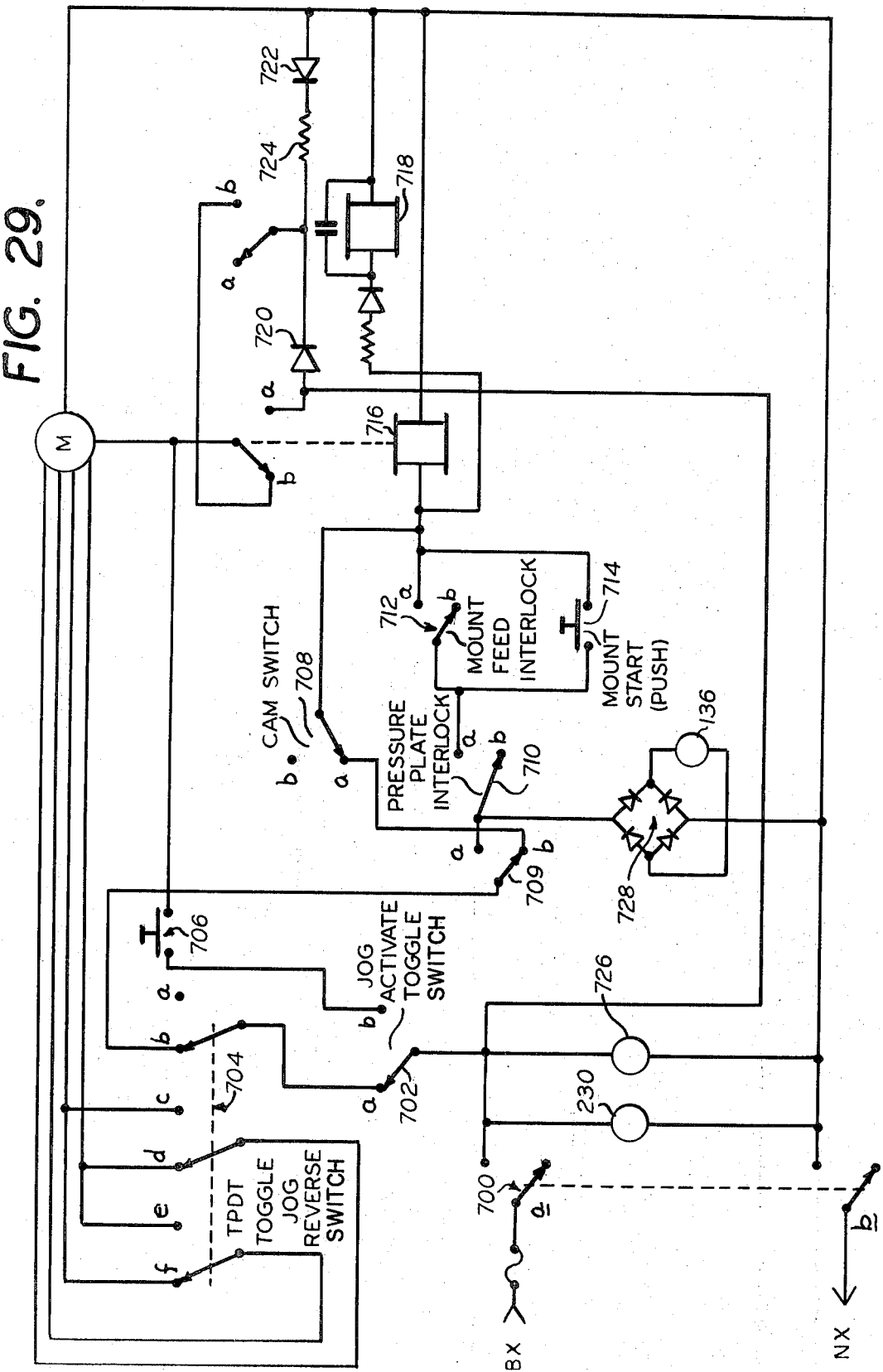

APPARATUS FOR AUTOMATICALLY MOUNTING TRANSPARENCIES IN SLIDEMOUNTS

Slidemounts are supplied to the apparatus by a hopper for a stack of slidemounts, the hopper having slots in the side thereof to permit the passage through its bottom of a mount transfer carriage which pushes the lowermost slidemount from the bottom of the hopper to the loading station where the transparency is disposed thereon. The movement of the mount transfer carriage actuates a pivotally movable folding member which folds half of the slidemounts upward. Disposed in the path of movement of the slidemount between the hopper and loading station is a camming member which engages the folded portion of the slidemount which folds it further so that it is at approximately 90° at the loading station. When the transparency has been disposed on the mount, the first mentioned carriage pushes the mount and transparency away from the loading station to the press and disposed in the path of such movement of the mount is another camming means to complete the folding of the mount before it enters the press.

BRIEF DESCRIPTION OF THE DRAWINGS

FIG. 7 is a top plan view of the slidemount guide assembly;

FIG. 8 is a side elevational view of the slidemount guide assembly;

FIG. 9 is an end elevational view of the slidemount guide assembly looking from the left of FIG. 7;

FIG. 10 is a perspective view of the slidemount folding mechanism of the present apparatus;

FIG. 11 is a sectional view taken along the line XI—XI of FIG. 3;

FIG. 12 is a sectional view taken along the line XII—XII of FIG. 11;

FIG. 13 is a top plan view of the slide transfer carriage of the present apparatus;

FIGS. 15, 16 and 17 are all somewhat schematic views illustrating the mode of operating the slide pusher dogs mounted on the slide transfer carriage of FIGS. 13 and 14 showing the carriage in various positions along its path of travel;

FIGS. 18, 19, 20 and 21 are somewhat schematic views of portions of the slide transfer carriage of FIGS. 13 and 14 illustrating the apparatus for and manner of moving the vacuum pad up and down in response to movement of the carriage;

FIG. 25 is a side elevational view of said press;

FIG. 26 is a side elevational view of a modified apparatus for closing the slide;

FIG. 27 is an end elevational view of said modified closing means;

FIG. 28 is a sectional view taken along the line XXVIII—XXVIII in FIG. 27;

FIG. 29 is a circuit diagram for the electrical controls for the apparatus of the present invention;

DETAILED DESCRIPTION OF THE PREFERRED EMBODIMENTS

Figure 1:
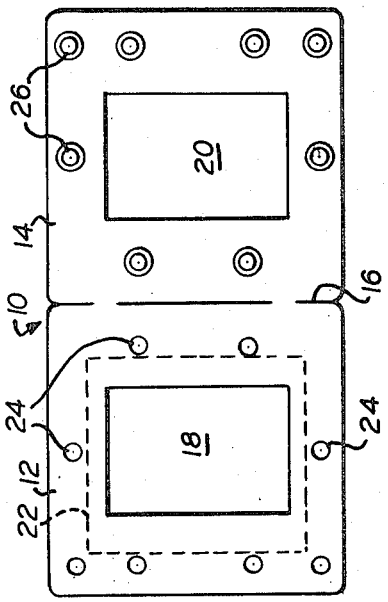
FIG. 1 is a plan view of a slidemount suitable for use on the apparatus of the present invention.

Referring now to the drawings in detail and particularly to FIG. 1 thereof, the apparatus of the present invention is primarily suited for use with plastic slidemounts which are held in a closed position by complementary interfitting means. An example of such a slidemount is described in detail in U.S. Pat. No. 3,242,605 granted to Johann O. Kleinschmidt, the contents of which are hereby incorporated by reference. In the slidemount of said U.S. Pat. No. 3,242,605 the slidemount 10 is fabricated into two halves 12 and 14 which are joined together by a perforated fold line 16. Each slide half 12 and 14 has an aperture 18 and 20 respectively therein for framing a transparency which may be seated along the dotted line 22 in FIG. 1. When a transparency is seated along the dotted line 22, the slidemount may be folded along the fold line 16 to bring the halves 12 and 14 into close confronting relation. Slidemount half 12 is provided with circular recesses 24 which receive with a frictional fit the cylindrical protrusions 26 on the slidemount half 14 to thereby frictionally hold the two halves in close confronting relation with a slide therebetween.

However, it will be understood that the apparatus of the present invention can be used with other forms of slidemounts, such as heat sealable paper slidemounts, although in such an instance a modification would have to be made to provide for heat sealing of the mount after it has been manipulated by the apparatus to be hereinafter described.

The apparatus 30 of the present invention comprises a base 32 with structural frame support F therewithin all enclosed in a housing 34 having an upstanding rear wall 36 terminating in an angularly extending upper end 38, a front control panel 40 extending at right angles to the angular upper end 38 of back wall 36, a front table top 42 disposed at an angle to the horizontal, for example 30°, for reasons which will become apparent hereinafter, and a front wall 44 which extends vertically from the lower end of the table top 42 to the base 32. Completing the housing are a pair of sides 45 one of which is seen in part in FIG. 2. Secured to the table top 42 are a pair of channel shaped members 46 and 48 which together form a slidemount feeding hopper 50 for containing a plurality of sidemounts 10 therewithin. Each of the channels 46 and 48 are provided with cutouts 52 and 54 on opposite sides to permit a slidemount 10 to slide therethrough upon being pushed toward a film for mounting.

Figure 2:
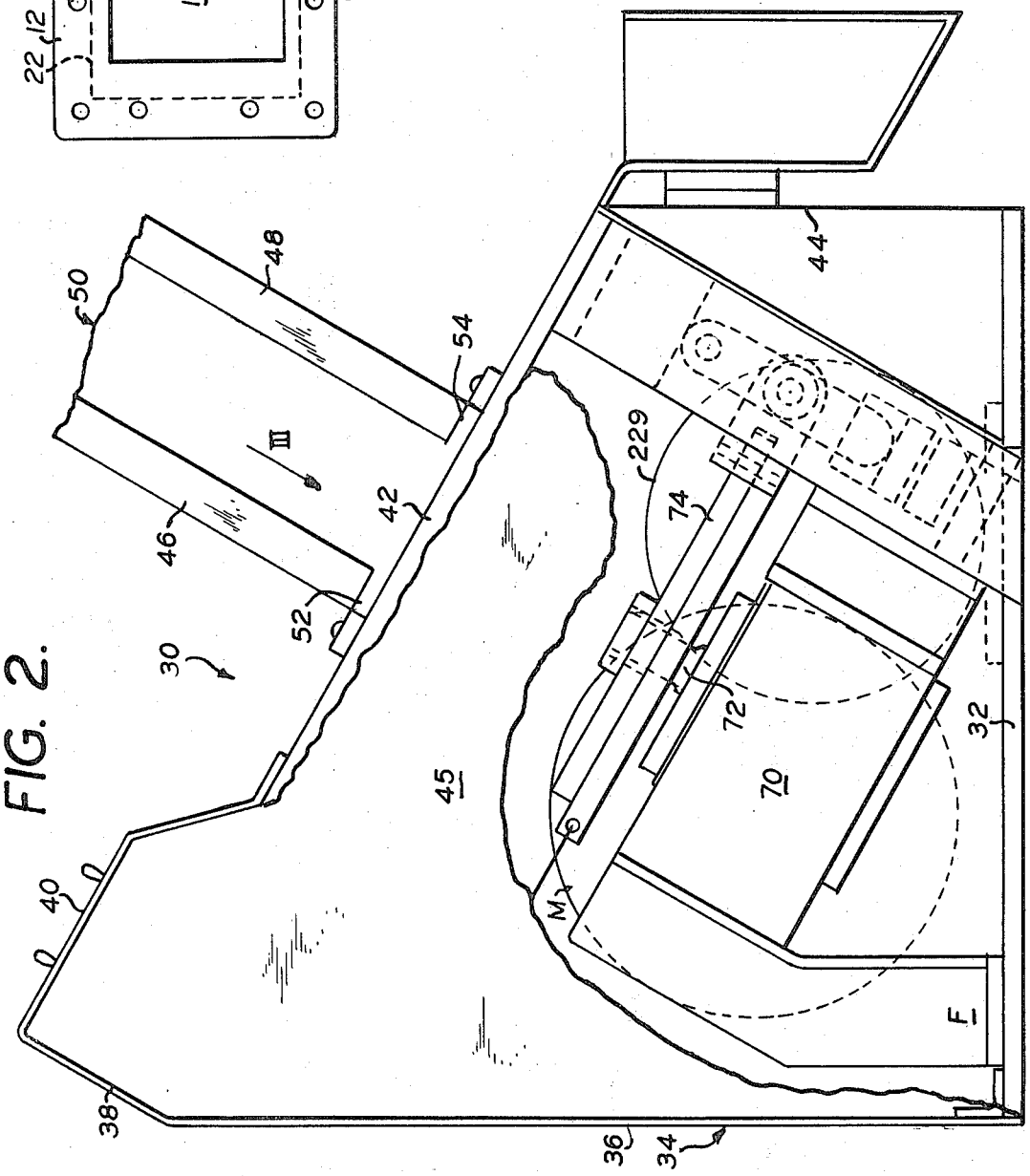
FIG. 2 is a side elevational view of the apparatus of the invention with parts broken away to illustrate other parts thereof.
Figure 3:
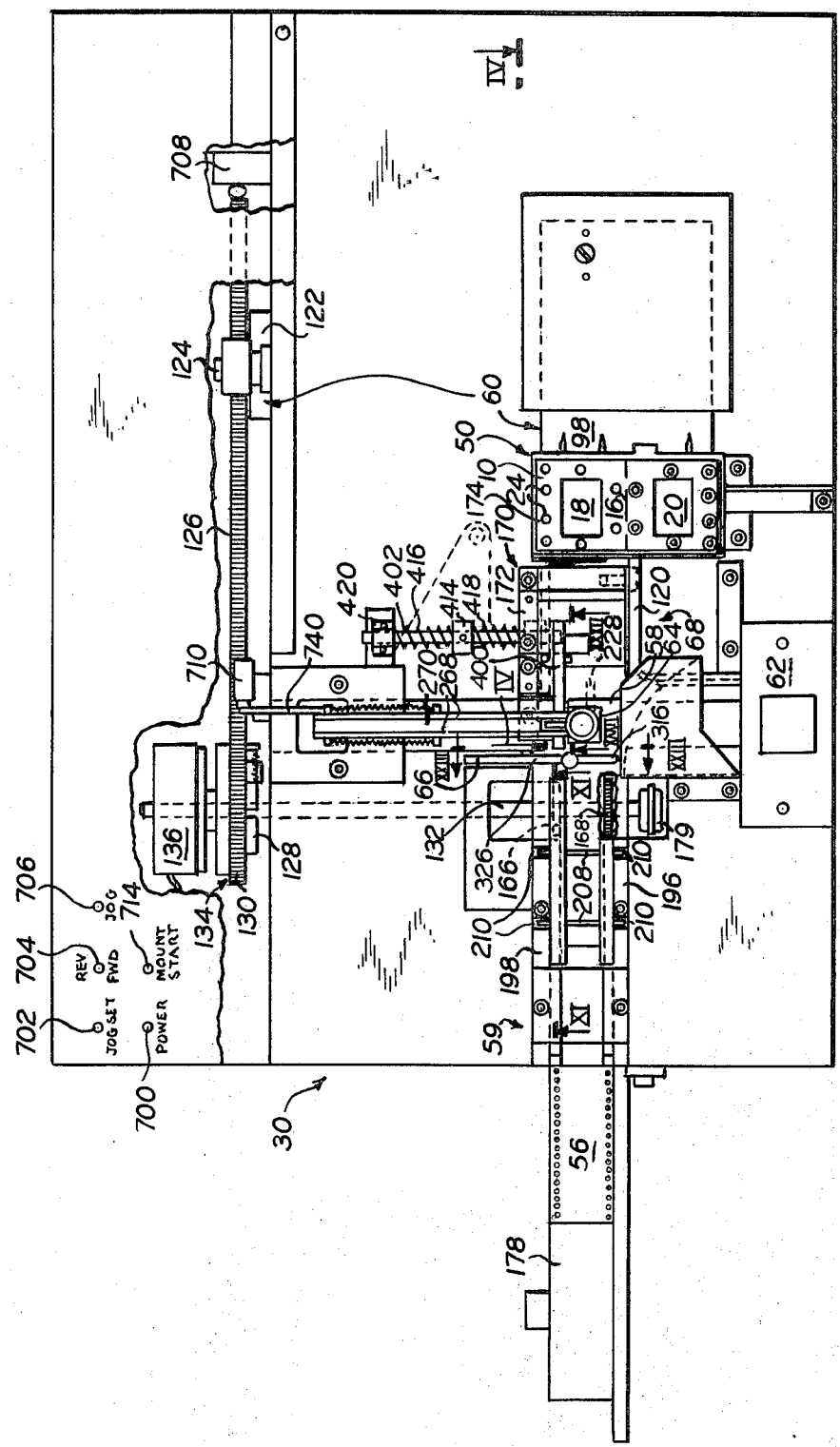
FIG. 3 is a plan view looking along the arrow III in FIG. 2 with portions broken away in order to illustrate other parts thereof.

Referring now to FIG. 3 in detail, the apparatus 30 includes means for supplying and guiding film 56 to a loading station 58, which means are generally designated by the reference numeral 59, a means for pushing a slidemount 10 from the hopper 50 to the loading station 58, which means includes a mount transfer carriage 60 that moves from right to left and back to the right again as viewed in FIG. 3, a means for transporting a superposed film chip and mount from a loading station 58 to the press 62, which means includes a slide transfer carriage 64, a cutting means 66 for cutting individual film chips or transparencies from the film 56 in timed relation with the operation of the second carriage 64, and means 68 for folding the slidemounts first to a substantially right angle condition in which they are maintained at the loading station 58 and then finally to a fully folded condition in which they may be pressed by the press 62. Motor power for the entire apparatus is provided by a motor M (FIG. 2) which motor is connected to a reduction gearing 70 the output shaft 72 of which has connected thereon a cam 74 which rotates with the shaft. As may best be seen in FIG. 4, mounted on the cam 74 is a crank 76 to which are pivotally secured by a pivot pin 77 and two connecting rods 78 and 80. The connecting rod 78 extends and is connected to the second carriage 64 for imparting down and up movement thereto as will be described (see FIG. 14) and the connecting rod 80 is pivotally secured as by a pivot pin 82 to the bottom of the carriage 60 for imparting right and left motion thereto.

MOUNT TRANSFER CARRIAGE

Figure 5:
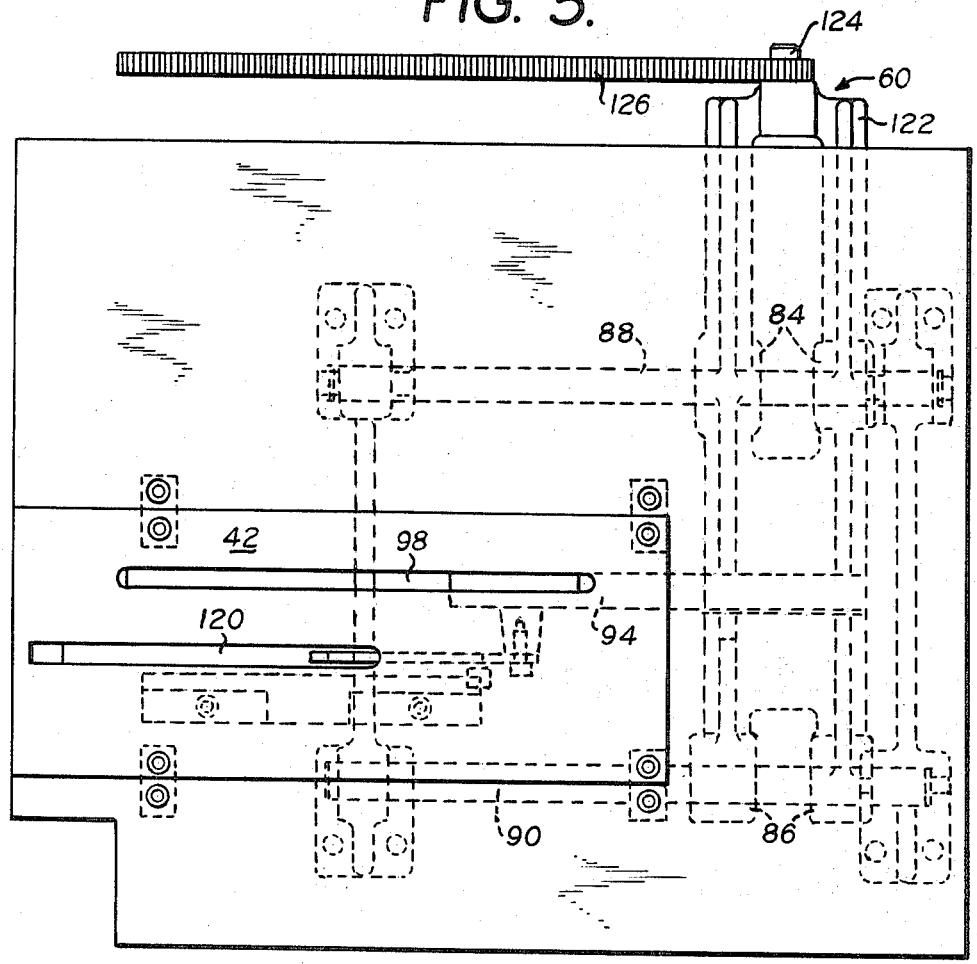
FIG. 5 is a plan view of the right hand side of the table surface (as viewed in FIG. 3) showing the mount transfer carriage thereunder.

Carriage 60 includes two pairs of Thomson lineal bearings, one pair being shown in FIG. 5 and being designed by the reference numeral 84 and the other pair being designated by the reference numeral 86. The two pairs of Thomson lineal bearings are respectively mounted on Thomson rods 88 and 90 to permit back and forth sliding movement of the carriage 60 in response to the movement of the connecting rod 80. Secured to the undercarriage 92 which carries the Thomson bearings 84 and 86, is an elongate member 94 having a forward upstanding portion 96 that fits through a slot 98 in the table top 42 for connection with a flat plate-like pusher member 98 that is movable under the hopper 50 through the cutouts 52 and 54 for pushing the lowermost slidemount 10 out from under the stack therein and for moving it towards the loading station 58.

Figure 4:
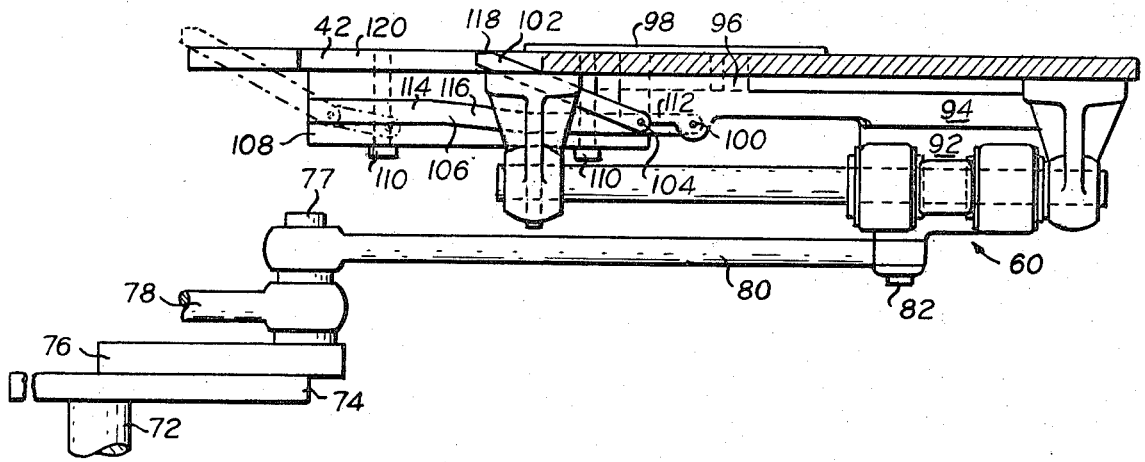
FIG. 4 is a sectional view taken along the line IV—IV of FIG. 3.

Mounted on the carriage 60 as by a pivot pin 100 is a swinging folding member 102 having a cam follower 104 thereon, which cam follower is disposed in a cam track 106 provided in a stationary depending bar 108 secured to the table top 42 as by screws 110. The cam track 106 has a pair of offset horizontal portions 112 and 114 joined together by an upwardly sloping portion 116. The swinging folding member 102 is so positioned and proportioned that its uppermost part 118 is flush with or slightly below the table top surface 42 when the carriage 60 is in its fully retracted or rightmost position as viewed in FIGS. 3 and 4. However, as the cam 74 and the crank 76 rotate to pull connecting rod 80 to the left as viewed in FIGS. 3 and 4, to thereby advance the carriage 60 to the left, the cam follower 104 engages the upwardly rising portion 116 of the cam track 106 and commences to move up and pivot the folding arm 102 upwardly about its pivot pin 100. Due to the relative distance from the pivot pin of the cam follower 104 and of the end 118 of the arm 102, the end 118 swings up a substantial distance as shown in dotted lines at the right end of FIG. 4 for a purpose which will become apparent hereinafter. The upward swinging is accomplished through a slot 120 in the table top 42. Upon rightward movement of the carriage 60, the reverse operation occurs to thereby return the arm 102 to its lowermost position as shown in FIG. 4.

FILM FEED

Figure 6A:
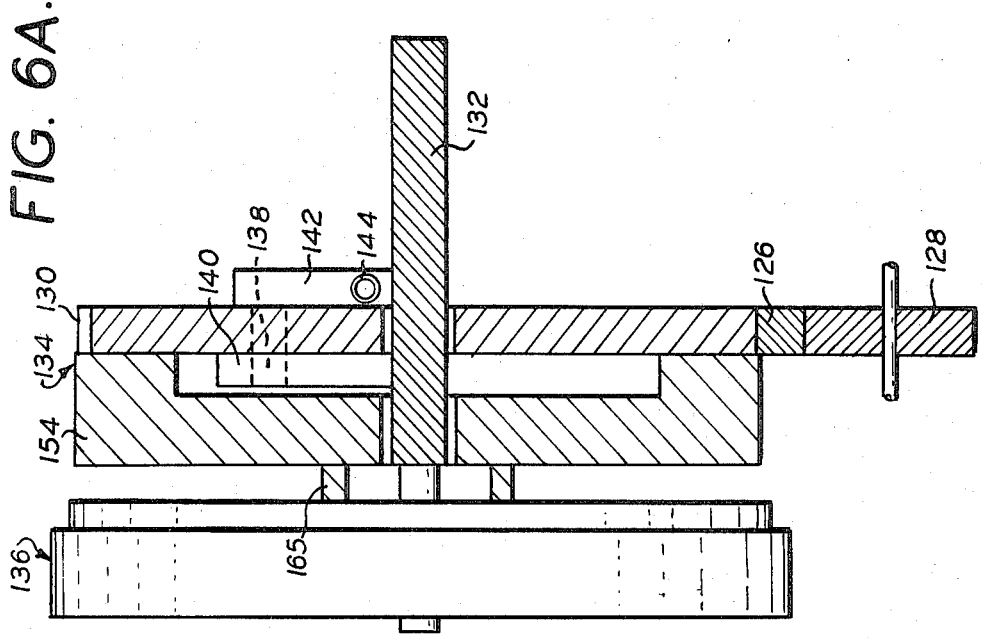
FIG. 6A is a sectional view taken along the line VIA—VIA of FIG. 6.

Connected to the end 122 of the carriage 60, as for example by a pivot pin or shoulder screw 124, is a rack 126 which extends across substantially the entire width of the machine under the table top 42. The rack may be seen in FIGS. 3 and 5. As may best be seen in FIG. 3, the rack 126 extends over a support therefor which support is designated by the reference numeral 128 and underneath a compansion pinion 130 which provides the main drive source for the film feed 59. It will be obvious to those skilled in the art that as the carriage 60 moves to the right as viewed in FIG. 3 to thereby move the rack 126 to the right, counterclockwise rotary movement will be imparted to the pinion 130, and when the carriage 60 moves to the left as viewed in FIG. 3, clockwise rotary movement will be imparted to the pinion 130 by the by the rack 126. Pinion 130 is rotatably mounted on a shaft 132. To impart rotation to the shaft 132 in response to rotation of the pinion 130, two clutches are provided, one a one way mechanical clutch 134 for assuring that the shaft 132 rotates only in one direction, namely the clockwise direction (as viewed from the front of the machine) and the other an electrical clutch 136. While a number of different forms of one way clutches may be employed, the preferred form of one way clutch 134 is illustrated in FIGS. 6 and 6A.

Pivotally mounted on the pinion 130 as by a pivot pin 138 is an arcuate dog 140 that rocks back and forth with the pinion as it oscillates in response to the reciprocable movement of the rack 126. Also secured to the pivot pin 138 is a lever 142 to which is connected a tension spring 144. The other end of the tension spring 144 is connected to the pinion 130 is at mounting 146. It will be obvious that the spring 144 tends to bias the lever 142 in a clockwise direction as viewed in FIG. 6 whereby to bias the arcuate dog 140 in a clockwise direction. The arcuate dog 140 cooperates with a pair of pins 148 and 150 that are secured to the confronting surface 152 of clutch member 154, the clutch member 154 being rotatable about the shaft 132. Clutch member 154 is provided on its peripheral surface with two parallel flats, the flats being designated by the reference characters 156 and 158 which flats are located 180° from one another. Cooperating with the flats 156 and 158 is a flat straight rod 160 which is pivoted at a pivot point 162 on a suitable frame member (not shown) which member 160 is strongly biased into engagement with the periphery of member 154 by a strong tension spring 164 secured at one end to the member 160 and at the other end to the frame F.

Figure 6:
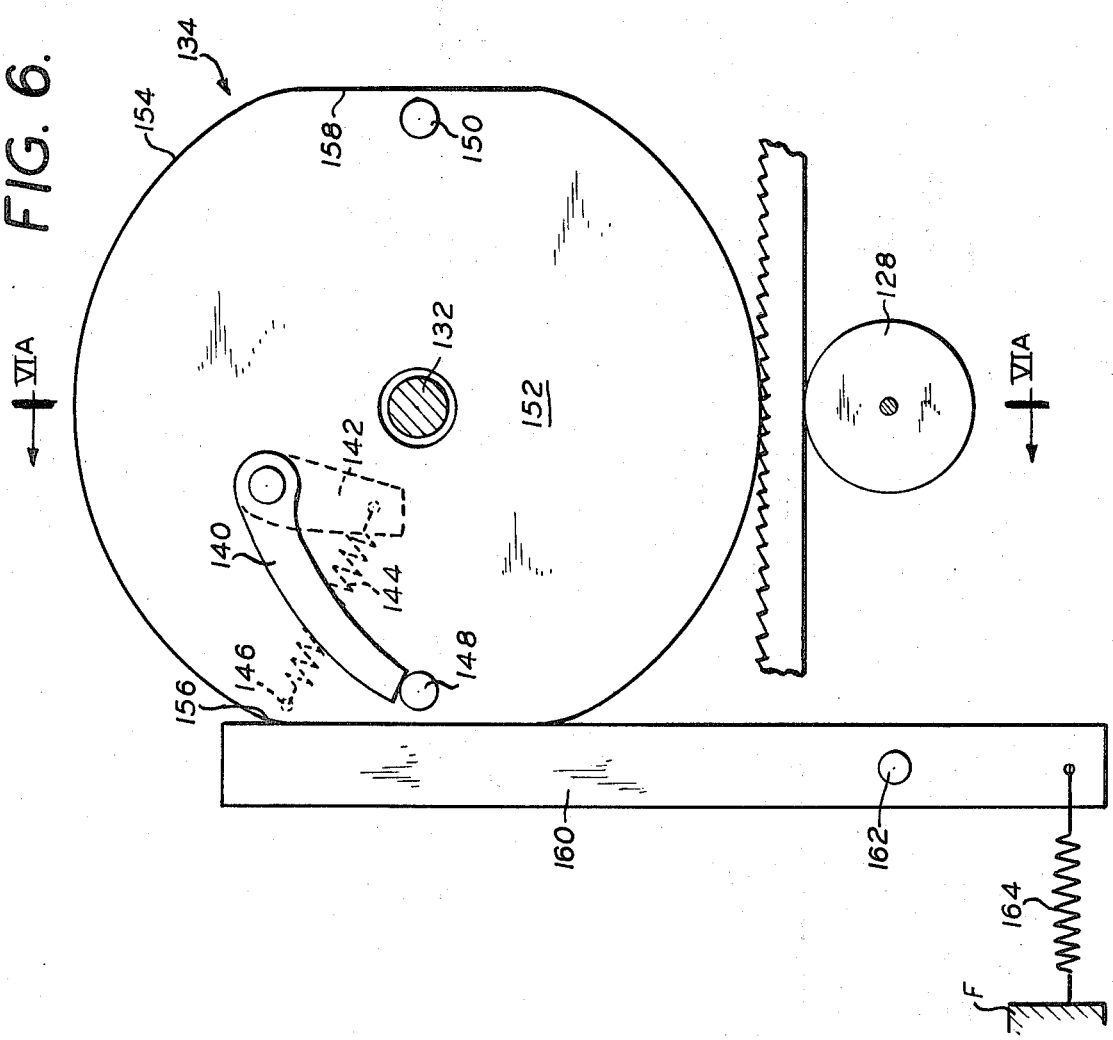
FIG. 6 is a partially schematic view of the one way clutch mechanism for advancing the film in response to movement of the mount transfer carriage.

In operation, as the rack 126 moves from left to right as viewed in FIG. 3, or right to left as viewed in FIG. 6, it will rotate pinion 130 in a clockwise direction whereby to move the dog 140 in a clockwise direction as viewed in FIG. 6 which clockwise movement will cause the dog 140 to impinge against the pin 150 secured to the member 154. This engagement between dog 140 and pin 150 will cause the dog 140 to rock against the bias of spring 144 in order to get past the pin 150. At some point after the dog 140 has cleared the pin 150, the carriage 60 will commence moving from right to left as viewed in FIG. 3 or left to right as viewed in FIG. 6, whereby to advance the rack 126 from right to left whereby to impart a counterclockwise rotation to the pinion 130 and hence to the dog 140. As the dog 140 starts moving from the extreme position, it will engage pin 150 and will not be able to be moved past it since the confronting surfaces make a sharp, firm engagement. Thus as the pinion 130 continues moving in a counterclockwise direction rotation will be imparted to the clutch member 154 through the dog 140 and the pin 150 whereby to move the pin 150 approximately to the position of the pin 148 in FIG. 6 and to move the pin 148 to the position shown in FIG. 6 for the pin 150. In accordance with one feature of this invention it is not particularly important that the number of degrees of rotation imparted to the pins by the dog 140 by exactly 180°, although it is vital that the amount of rotation of the member 154 be exactly 180° from start to finish during a particular left to right movement of the rack 126. The reason that the rotation by the dog does not have to be exactly 180° is due to the fact that a supplementary means for rotating the member 154 a short angular distance is provided which means is the member 160 and the flats 156 and 158. Specifically, so long as the dog 140 rotates the member 154 into a position where one of the flats is in confronting relation with the member 160, although not necessarily in coincidence or in parallel orientation, the force exerted by the member 160 on clutch member 154 will be sufficient to rotate the member 154 through the small angular distance to bring the flat into surface-to-surface engagement with the member 160 whereby to insure a proper indexing of the member 154. This short angular rotation effected by the member 160 will occur whether the member 154 undershoots or overshoots the 180° mark as long as the undershooting or overshooting is not a very large number of degrees, that is well within easy machining tolerances. Thus through the clutch 134 it is certain that the member 154 will, on each operation of the rack from the extreme right position to the extreme lefthand position, rotate 180°.

Fixed to the member 154 is a collar 165 that is also fixed to the input end of the electric clutch 136. Assuming the electric clutch to be actuated, each time the member 154 rotates 180° the electric clutch will impart 180° movement to the shaft 132. As can best be seen in FIG. 3, the shaft 132 extends from the electric clutch to a pair of film sprockets 166 and 168 which are spaced apart the standard distance for the sprocket holes of film 56. Thus when film 56 is taken from a spool 178 and fed through a film guide to be described hereinafter, it can be brought into engagement with the sprockets 166 and 168. Thereafter, each time the carriage 60 moves from right to left to advance a slidemount 10 from right to left, the shaft 132 will rotate the sprockets 166 and 168 180° clockwise as viewed from the front of FIG. 3. The sprockets are proportioned so that a 180° rotation by them will advance the film by one frame whereby to move a film frame to the station 58 for mounting on a slide 10. It should be noted that a hand wheel 179 is mounted on shaft 132 to enable manual rotation of sprockets 166 and 168. This enables the initial manual positioning of the film prior to automatic operation

SLIDEMOUNT GUIDE AND FOLDING MEANS

As previously stated, pusher member 98 passes under a slot in the right end wall of the hopper 50 which slot is defined by right wall cutouts 52 and 54 (not shown) to engage the lowermost slidemount 10 and to push it out through the slot in the left wall of the hopper 50 which slot is defined by the left wall cutouts 52 and 54 seen in FIG. 2. Thereafter the slidemount 10 is advanced from its position within the bottom of the hopper 50 to the loading station 58. However, when advancing the slidemount 10 by the pusher 98 it is important that the illustrated orientation of the slidemount 10 be maintained. To accomplish this a suitable slidemount guide means 170 is included. Means 170 may be seen in FIGS. 3, 7, 8 and 9. As viewed in FIG. 3 a guide block 172 is provided for engagement with the upper edge of the slidemount 10. This guide block 172 is provided with a stepped notch or groove along its lowermost edge extending in the direction of movement of the mount 10 as it moves from the hopper to the loading station 58. This stepped groove is proportioned to be complementary to the flat marginal lip of the slidemount, which lip is designated by the reference numeral 174 in FIG. 3 and also to receive a portion of the circular protrusions 24 which extend above the surface of the flat marginal portion 174. Thus member 172 holds the upper edge of the mount flat down against the table top 42 while permitting sliding movement thereof. At the upper end of the guide block 172 there is a longitudinally extending notch 176 to receive therewithin a cover plate 178 having a downwardly extending side plate 180 the bottom of which is disposed in spaced relation with the table top surface 42 when the cover is in lowered condition. It will be seen that the cover 178 is pivotally mounted on a mounting block 182 that extends transversely of the slide block 172 and is secured thereto. Clearly the lower edge of the guide block 182 must be above the table top surface 42 in order to provide clearance for the slidemount 10 sliding thereunder. The bottom edge of the block 178 may be seen in FIG. 9 and is designated therein by the reference numeral 184. With the stepped notch 174 holding down the upper end, and with the lower end of the plate 180 engaging the upper half of the slidemount 10 just above the center fold line 16, the upper half of the mount 10 can be held in flat condition up against the table top surface 42 while the lower half thereof is folded.

For the purpose of folding the lower half of the slidemount 10, two mechanisms are provided. The first of these has already been described as part of the mount transfer carriage and is the swinging folding arm designated by the reference numeral 102. It will be recognized that the folding arm 102 moves along with the pusher 98 and hence with the slide being pushed thereby. After the slide has entirely cleared the hopper and is thus free to be bent, the cam follower 104 on the folding arm 102 moves into the angular portion 116 of the cam track to commence raising the arm 102. As can best be seen in FIG. 3 the arm 102 is located just below the center fold line 16 of mount 10 so that as it moves up to engage the lower half of the slidemount 10, it will force the lower half of the slidemount upward out of the plane of the table top 42. At the same time the slidemount will continue its leftward movement. Referring now to FIG. 10, as the slidemount continues moving to the left and the folding arm 102 continues moving upward the slidemount is finally bent to close to but not quite a 90° angle. However, it is bent far enough to clear the arcuate nylon block 190 in the folding mechanism 68 which nylon block is secured to the bottom of a support plate 192 that is held above the table top 42 by an upright member 194. The curved nylon block 190 will engage the forward edge of the partially folded slidemount 10 and will continue to bend it as the slidemount advances from left to right as viewed in FIG. 10, which is from right to left as viewed in FIG. 3. By the time the carriage 60 reaches its extreme lefthand position to cause the slidemount 10 to be at the loading station 58, the slide will have been bent slightly more than 90° in order to make sure that it is clear of the folding arm 102 upon the retraction of that arm during the return movement of the carriage 60.

FILM GUIDE MEANS

The film supply means has already been described in detail. However, means must be provided for assuring that the film is guided accurately to the loading station 58 so that a usable slide is formed by the marriage of the transparency and the mount. As best shown in FIG. 12, the guide for the film 56 includes a pair of guide rails 196 and 198 suitably secured to table top 42 and having internally projecting portions 200 and 202 respectively. A tapered guide is mounted on each of the projections 200 and 202 to form the necessary guide for the film 56. The tapered guides are designated by the reference numerals 204 and 206 which guides are secured together by crossrods 208 which fit into complementary slots 210 in guide rails 196 and 198 to hold the tapered guides as best shown in FIG. 12. By employing tapered guides, assurance is achieved of smooth feeding and accurate guiding of the film 56 as it is advanced along the guideway by the sprockets 166 and 168.

As the film has a tendency to curl, there is a possibility during the simultaneous feed of the film and the slidemount that the film and slidemount interfere with one another's movements whereby to interrupt the operation of the machine. Means are provided for preventing this interference. Specifically, a concave shaped finger 400 is provided to guide the film over the path of the slidemount. This is best illustrated in FIGS. 3 and 30 to 32 in which the finger may be seen to extend from the knife blades 312, 316 toward the slidemount magazine 50. The finger 400 is held in an elevated position by rod 402 in order to allow the slidemounts 10 to pass thereunder. However, the end closest the knife blade 316 is curved downwardly in order to receive the somewhat elevated film and guide it up out of the way of the slidemount as each moves in the direction shown by the arrows in FIG. 32. However, once the slidemount and and film are located in their proper position, the finger 400 must be withdrawn or it will interfere with a proper seating of the film on the slidemount. To effect the withdrawal, a plate 404 is pivoted as at 406 to the bottom of top surface 42. The plate is triangular in configuration and the pivot 406 is at one of the apexes of the triangle. Secured at the uppermost apex of the triangular plate 404 is a cam follower roller 408 that is normally disposed in the path of movement of a cam block 410 mounted on the second carriage 64 (see FIG. 13). At the third corner of the triangular plate 404 there is an upstanding rod 412 having a bushing 414 at the top thereof which bushing is secured to the rod 402 that is connected to the finger 400. As may best be seen in FIG. 3, disposed about rod 402 are a pair of compression springs 416 and 418. The compression spring 418 is disposed between the side guide 172 and the bushing 414 and tends to push the rod 402 upward as viewed in FIG. 3. However, the upper spring 416, which is significantly stronger than the lower spring, is disposed between a bearing block 420 and the bushing 414 and accordingly pushes the rod 402 downwardly as viewed in FIG. 3 with a greater strength than the spring 418 pushes upwardly. Thus the net effect of the springs 416 and 418 is to push the rod 402 downwardly whereby to tend to pivot the triangular plate 404 in a counterclockwise direction as viewed in FIG. 3. With this bias, the finger 400 is in the extended position for holding the film out of the way of the slide. However, when it is desired to withdraw the finger 400 from the position shown in FIG. 3 and to move it upwardly out of underlying relation with the film in order to enable the film to be pulled downwardly on the slidemount by the vacuum pad 224, the carriage 64 moves upwardly and carries with it a cam block 410 that will engage the roller 408. Continued movement of the carriage 64 in the direction of the arrow in FIG. 30 will pivot the triangular member 404 in a clockwise direction whereby to move the member 412 upwardly as viewed in FIG. 30 to thus move the finger 400 upwardly as viewed in FIG. 3. Upon the return of the carriage to a lower position, the cam block 410 disengages from the roller 408 and the springs 416 and 418 will return the triangular plate 404 to the normal position defined by the stop 422.

SLIDE TRANSFER CARRIAGE

As previously described, there is a slide transporting carriage 64 that moves from an uppermost position as viewed in FIG. 3 to a lowermost position as viewed in FIG. 3 to transport the slide, that is the assembled transparency and slidemount, from the assembly or loading station 58 to the press 62. This carriage 64 is shown in detail in FIGS. 13 and 14. Specifically, a pair of Thomson rods 212 and 214 which are parallel to each other and which extend parallel to and beneath the surface of the front panel 42 extend from the press 62 to a location near the back of the machine. The rods 212 and 214 are suitably secured to the press 62 and to a suitable bracket making up a part of the frame near the back of the machine. Mounted on the Thomson rods 212 and 214 are two pairs of Thomson linear bearings 216 and 218 respectively which bearings are disposed in a suitable carriage under support 220 that may be a casting. The connecting rod 78 is secured to the center of the carriage support by a suitable pivot pin 222. Thus rotary movement of the crank 78 in response to rotation of the motor M will impart reciprocable movement to the carriage 64 along the Thomson rods 212 and 214.

VACUUM PAD

The main functions of the carriage 64 are to grasp the film and hold it against the slidemount 10 at the loading station 58 and thereafter simultaneously to transport the film and the companion slidemount down toward the press 62 for final closure of the slide. Separate mechanisms are provided to perform these functions and various auxiliary mechanisms are associated with or actuated by the slide transfer carriage 64. To grasp the film and hold it on a slidemount 10 a vacuum pad 224 is provided which vacuum pad has a suitable hose connector 226 for connection by a hose 227 to a pump 29 (see FIG. 2). The film 56 as it is delivered to the loading station 58 is disposed above the upper surface of the slidemount 10. Thus it is necessary for the vacuum pad to be moved upwardly through the aperture 18 in the slidemount to engage the lower surface of the film 56 and to pull that film downwardly against the upper surface of the slidemount. In order to accomplish this, means must be provided for raising and lowering the vacuum pad 224 in response to reciprocable movement of the carriage 64. This means includes a camming surface 228 on the interior of the vacuum pad 224 and a complementary cam 230 that is movable linearly relative to the vacuum pad 224 in order to raise the vacuum pad and to permit downward movement under the urging of biasing spring 232 for that vacuum pad. Specifically, as may be seen in FIGS. 13 and 14, secured to the vacuum pad 224 are a pair of pins 234 which extend down through the carriage in sliding relation therewith and are provided at their bottoms with suitable shoulders or flanges 236. Disposed between the shoulders of flanges 236 and the bottom of the carriage are a pair of compression springs 232 which bias the pad 224 to the lowermost position. However, when the cam 230 and the vacuum pad 224 are moved toward one another, the vacuum pad will move up along the camming surface 230 against the bias of the springs 232. To effect this movement between the cam 230 and the vacuum pad 224 there is a push rod 238 which has one end extending beyond the upper end of the carriage 64 (right end as viewed in FIGS. 13 and 14) and the other end abutting against the vacuum pad 224, as may be seen at location 240 in FIG. 13 and more clearly in FIGS. 18 through 21.

Provided at the upper end of the path of travel of the carriage 64 is a suitable block 242 which may be engaged by the push rod 238 to push the vacuum pad 224 toward the cam 230 whereby to cause the elevation thereof. This will be discussed in greater detail hereinafter.

Figure 14:
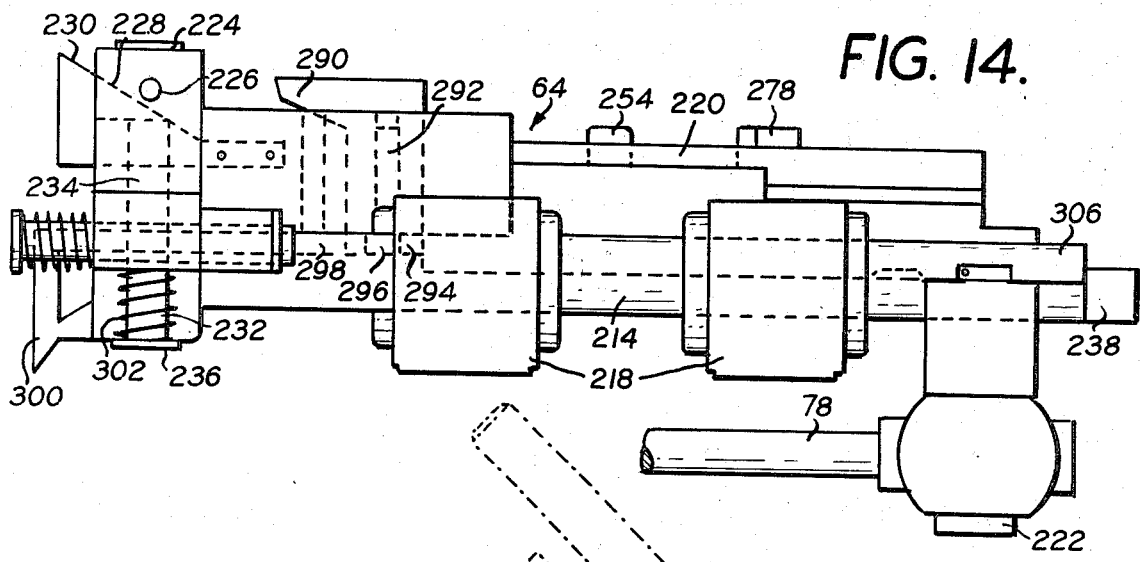
FIG. 14 is a side elevational view of said slide transfer carriage.
Figure 22:
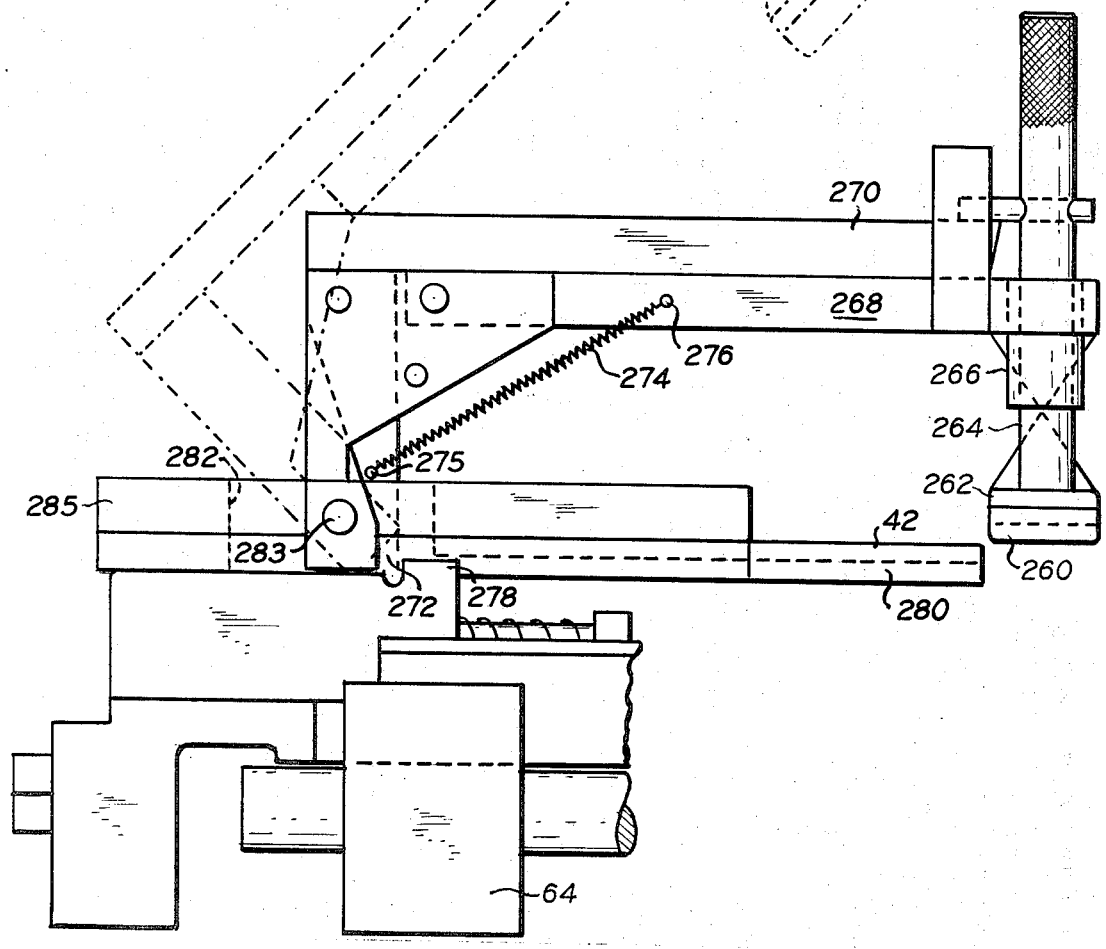
FIG. 22 is a side elevational view of the pressure pad support and moving means of the present invention.

As already noted, in grasping the film 56 to position it on the slidemount 10, it is necessary for the vacuum pad 224 to move up through the aperture 18 in the slidemount to the somewhat elevated film, to grasp the film by means of the vacuum, and then to bring the film downwardly and hold it on the upper surface of the slidemount. If the vacuum pad 224 were permitted to return to its initial position as shown in FIG. 14, it would be moved downwardly so far after grasping the film that the vacuum would be broken and the film would be lost. Thus some means must be provided for holding the vacuum pad in an intermediate position which is lower than the position in which it grasps the film by vacuum but higher than its fully retracted position as shown in FIGS. 14 and 18. The means for achieving this intermediate position is an intermediate stop means provided on the vacuum pad which cooperates with a spring pressed stop rod 244. Specifically, the substantially vertical surface of the vacuum pad facing away from the press 62 is provided with a cutout 245 which terminates in a suitable ledge 246 at the upper end thereof. The stop rod 244 is provided with a tapered end 248 that is above the ledge 246 when the vacuum pad 224 is in its lowermost position. However, when the vacuum pad is moved upwardly by the cam 230 as a result of the push rod 238 engaging the block 242 to push the vacuum pad 224 to the left as viewed in FIG. 18, the cutout or notch 245 moves upwardly as part of the vacuum pad to cause the ledge 246 to clear the pointed end 248 of the stop rod 244. The stop rod is biased by a compression spring 250 toward the left by means of the compression spring impinging against a suitable block 252 on the carriage 64 and against an actuator member 254 fixed to the stop rod 244. Thus the stop rod 244 will move to the left to dispose the pointed end 248 within the cutout 245. This may best be seen in FIG. 19. Upon the carriage 64 moving toward the left, the first thing that will occur will be that the cam will move away from the vacuum pad 224 whereby to permit a lowering of the vacuum pad. However, the vacuum pad will not be permitted to move all the way down to its initial position as shown in FIG. 18 since the ledge 246 will engage the pointed end 248 of the stop rod 244 to hold the vacuum pad in the intermediate position. In this intermediate position the transparency 56 will be held against a slidemount (not shown in FIG. 20) and will permit the simultaneous movement of these two members towards the press 62 without relative movement therebetween. This will assure good orientation and alignment of the film in the mount. As the carriage 64 moves the film and mount into the press 62, as best shown in FIG. 21, the actuator 254 will engage a stop 256 secured to the bottom of the table top 42 to move the stop rod 244 to the right against the bias of spring 250 to thereby withdraw the pointed end 248 thereof from the recess 245. This withdrawal will permit the vacuum pad 224 to move downwardly to its initial lowermost position under the urging of the springs 232 whereby to break the vacuum and leave the mount in a folded position for permanent closure by the press.

PRESSURE PAD

Referring now to FIGS. 18 through 22, means are illustrated for assisting the vacuum pad in making a vacuum seal with the film 56 in order to carry the film along with the vacuum pad as previously described. That means includes a vertically shiftable pressure pad 260 which is adapted to be moved into engagement with the upper surface of the film at the time that the vacuum pad is moved into engagement with the lower surface of the film so as to sandwich the film between the two pads and thus assure a good vacuum seal. After the seal has been effected, the pressure pad is withdrawn to an elevated position. The pressure pad 260 may be made of any suitable rubber or plastic material, preferably a quite firm plastic, such as polyurethane.

The pressure pad is secured to a suitable metal backing washer 262 which in turn is connected to a slidable rod 264 that is slidably mounted in a bushing 266 that is carried by a pair of side supporting members 268 (see FIG. 3). Pivotally mounted on the two side members is an L-shaped center member 270 having a downwardly extending actuating protrusion 272 that extends below the table top surface 42. A pair of springs 274 are secured at one end to the side members 268, as at 276 and are secured at their other end to the downwardly extending portion 272 of the center member 270, whereby to bias the center member 270 in a counterclockwise direction as viewed in FIG. 22 to thereby normally tend to raise the pressure pad 260. Thus, normally, the pressure pad 260 is in the dotted line position shown in FIG. 22. However, secured to the carriage 64 along the top thereof is an actuating member 278 which rides in a groove 280 in the bottom of the table surface 42 which groove 280 registers with a slot 282 in the surface of the table top 42 through which the downwardly extending portion 272 extends. Thus the portion 272 is in the path of travel of the actuating member 278. Accordingly, when the carriage 64 is moved to its extreme upper position remote from the press 62, in which position the push rod 238 causes the vacuum pad 224 to move upwardly to engage the film, the actuating member 278 engages the downward portion 272 and rocks the center member 270 in a clockwise direction against the bias of springs 274 to lower the pressure pad 260 to its solid line position as shown in FIG. 2 which lowered position is also viewable in FIG. 19. In this position, the vacuum pad 224 can effect a good vacuum seal with the film 56 and thus assure that it can transport the film.

The side members 268 are both pivotally mounted on a pivot pin 283 which is fixed to the block 285 in which slot 282 is provided. This pivotal mounting permits the entire presser pad assembly to be pivoted about the pivot 283 from the solid line position shown in FIG. 22 to the dotted line position shown in that figure whereby to remove the presser pad assembly entirely from obstructing position for maintenance of the apparatus or for observation of its method of operation. As will be seen hereinafter, the pivotal motion of the presser pad assembly to the dotted line position actuates a switch 710 to effect the electrical control circuit for the apparatus.

PUSHER DOGS

Referring now to FIGS. 13 to 17, as previously mentioned, one of the important functions of the carriage 64 is to push the slidemount and the transparency from the assembly station 58 to the press 62. To accomplish this a pair of pusher dogs 290 are provided. Specifically, the pusher dogs 290 are somewhat shaped like bell cranks and are pivoted on carriage 64 by a pivot pin 292. The pusher dogs 290 are provided at their bottoms with downwardly extending protrusions 294. The front of the protrusions 294 are engageable by the cross member 296 of a T-shaped pusher rod 298 the front of which extends beyond the front of the vacuum pad 224. The front of the T-shaped pusher rod 298 cooperates with a bell crank 300 which is pivoted on the carriage 64 at pivot 302 for retracting or withdrawing pusher dogs 290 so that they are disposed below the surface of the table top 42. Cooperating with each pusher dog 290 is a push rod 304 and 306 which is slidably mounted in a suitable groove 308 and 310 respectively in carriage 64 for engaging the trailing end of the protrusions 294. The push rods 304 and 306 are used to extend or project the pusher dogs 290 as will now be described.

As the carriage moves to the rightmost position as viewed in FIGS. 15 to 18 in which the push rod 238 engages the block 242, whereby to push the push rod 238 to the left, the push rods 304 and 306 which are in their extreme right hand position as the engagement is effected also engage the block 242 and are moved to the left as viewed in FIG. 15 whereby to rock pusher dogs 290 in a clockwise direction and thereby cause them to extend above the surface 42 of the table. In this extended position, assuming following movement of the carriage 64 to the left as viewed in FIG. 15, the pusher dogs 290 will engage the edge of the slidemount 10 and move it away from the loading station 58 toward the press 62. This is shown in FIG. 16. As the carriage approaches the press 62, the lowermost tip 308 of the bell crank 300 will engage a pivoted stop 310 and pivot the stop in a counterclockwise direction in order to pass over the stop. This will permit continued movement of the carriage to the left as viewed in FIGS. 15 to 17 (which movement is downward as viewed in FIG. 3) without the retraction of the pusher dogs 290. Thus the slide will continue its uninterrupted movement into the press 62. Upon the depositing of the slide in the press, the carriage 64 reverses its direction and commences moving back to return the pressure pad to the loading station 58. The lowermost tip 308 of the bell crank 300 again encounters the pivoted stop 310 but engages the tip 312 thereof and rocks the stop in a clockwise direction. By doing this the bell crank cannot clear the stop unless it in turn rotates about its pivot 302 in a clockwise direction. In rotating in a clockwise direction the crank 300 pushes the T-shaped pusher rod 298 to the right as viewed in FIGS. 15 to 17 whereby to pivot the pusher dogs 290 in a counterclockwise direction to retract or lower the pusher dogs. The purpose of this retraction is to enable the pusher dogs to move under the next mount that has been moved to the loading station 58 which mount is already in position by the time the pusher dogs move under the station 58 to get in position for e next push. However, as the carriage continues its rightward movement (upward movement as viewed in FIG. 3) the push rod 306 will again engage the block 242 to restore the pusher dogs 290 to the position of FIG. 15 and condition carriage 64 for the next movement.

FILM CUTTER

Figure 23:
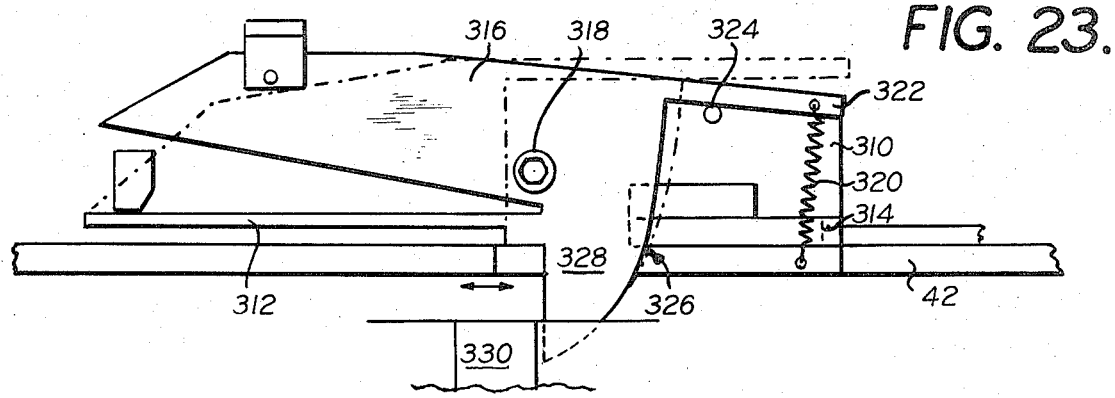
FIG. 23 is a sectional view taken along the line 23—23 of FIG. 3.

The carriage 64 also serves to actuate a film cutter to cut the film after one frame has been advanced. The film cutter is best seen in FIG. 23 and includes a suitable support block 310 on which a stationary blade 312 is mounted by means of screws 314 into the bottom of the block 310. Pivotally mounted on the side of the block 310 is a moveable blade 316. The pivot is shown by the reference character 318. The blade 316 is normally biased in a clockwise direction to a raised position by a tension spring 320 that is secured to a rearward extension 322 of blade 316 and to the table top 42. A stop 324 secured to the side of the block 310 prevents unlimited rotation of the blade 316. Extending down through a slot 326 in table top 42 is a downward projection 328 of blade 316 that is disposed in the path of movement of an actuator 330 on the side of carriage 64 (see FIG. 13). The actuator 330 is located on the carriage in such a position so that it engages the downward projection 328 near the very end of the upward movement of the carriage as viewed in FIG. 3 to rock the movable blade 316 in a counterclockwise direction downwardly into a shearing relationship with stationary blade 12 to thereby cut off film disposed therebetween. By suitable initial adjustment of the location of the film relative to the blade it can be assured that the blade will each time cut just one frame, this assurance coming from the fact that the film feed is arranged to advance the film one frame width per operation of the carriage.

DEPOSITING SLIDE IN PRESS

After the film has been brought into overlying relation with the slidemount and the slidemount has been folded slightly more than 90° and the film has been cut by the cutting blade 316, the slide including the semifolded slidemount and the transparency overlying it are in a condition to be moved to the press 62. However, during that movement the slide must be fully folded.

The manner of movement of the slide by the pusher dogs 290 has already been described. However, with reference again to FIG. 10, as the pusher dogs commence moving the slide toward the press 62 from the loading station 58, with the vacuum pad 224 holding the film in fixed relation relative to the slidemount, the upwardly extending portion of the slidemount 10 engages a pair of arcuate camming surfaces for completing the folding operation. The first of the surfaces to be engaged is the arcuate camming surface 500 on the upstanding support 194 for the plate 192 of the folding mechanism 68 and this arcuate member forces the projecting portion of the slidemount downwardly as the slidemount moves through the folder on its way to the press 62. After an initial folding on only one edge of the slidemount by the surface 500, the other edge of the slidemount will come into engagement with a similar arcuate surface 502 on an upstanding member 504 which surface will cooperate with the surface 500 to complete the fold of the slidemount. Before the slidemount completely disengages the surfaces 500 and 502, the leading edge thereof has already entered into the press 62 to prevent the unfolding of the slidemount as it travels from the loading station to the press.

PRESS

Figure 24:
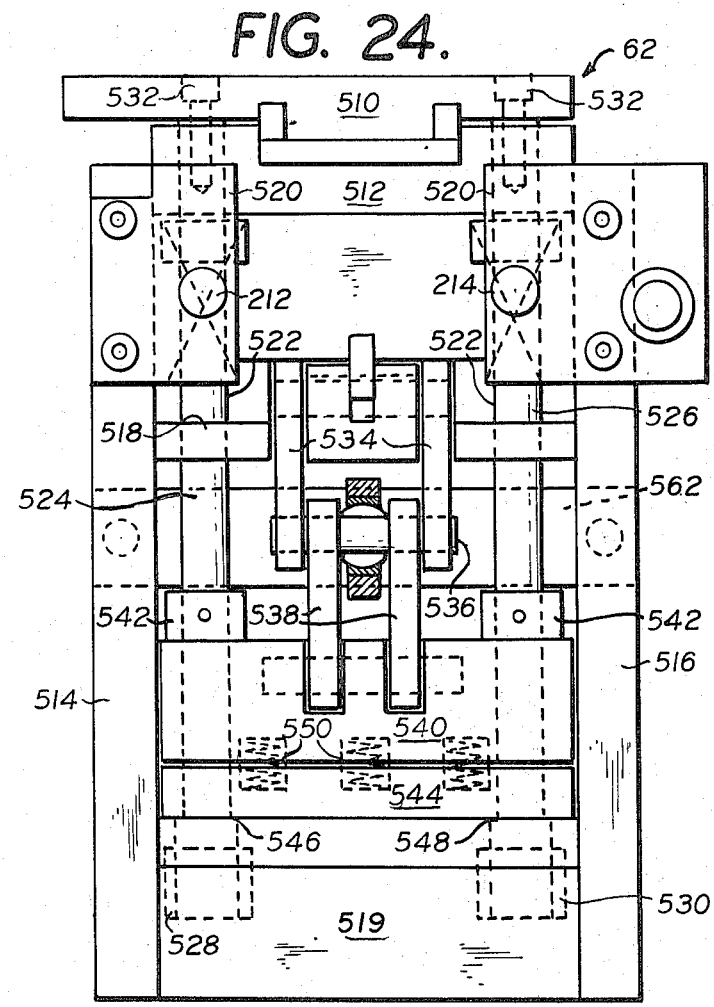
FIG. 24 is a front elevational view of the press for closing the slide after the transparency has been disposed therein.
Figure 30:
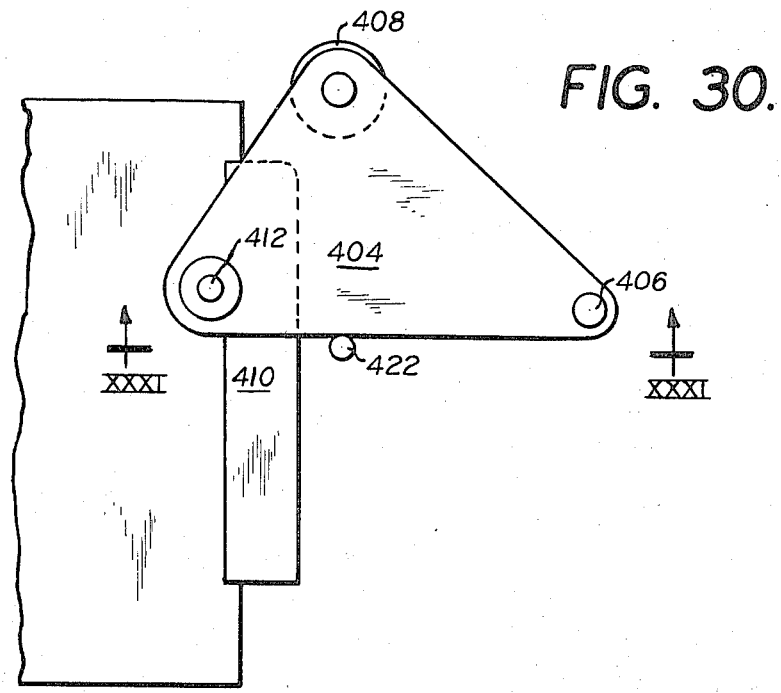
FIG. 30 is a top plan view of a portion of the mechanism for controlling the film and slidemount guide finger of the present invention.
Figure 31:
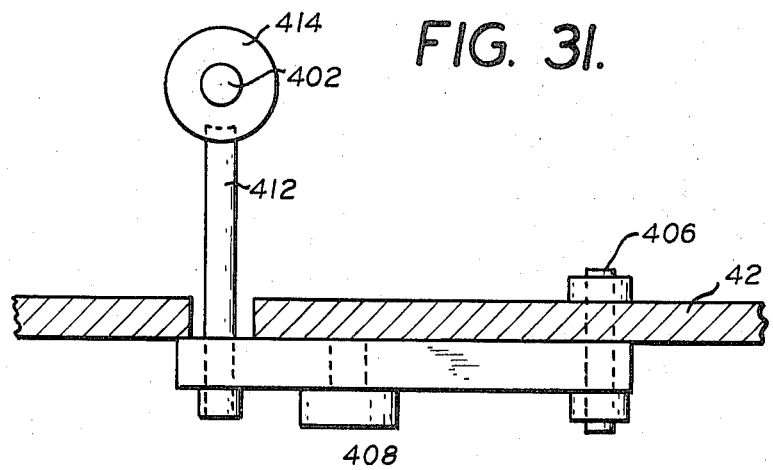
FIG. 31 is a sectional view taken along the line XXXI—XXXI in FIG. 30 with certain parts deleted therefrom.
Figure 32:
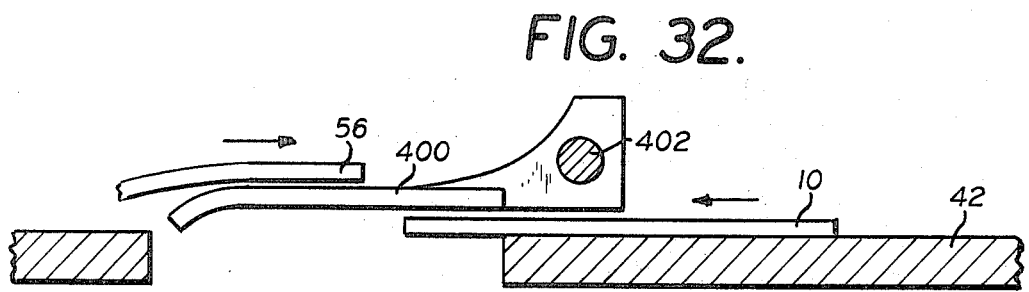
FIG. 32 is a sectional view taken along the line XXXII—XXXII of FIG. 3.

The press is illustrated in FIGS. 24 and 25 and includes a movable upper platen 510 and a stationary lower platen 512 which between them compress a folded slide to bring the complementary interengaging means into frictional engagement to thereby hold the slide in a substantially permanently closed condition. The press 62 is supported by a pair of side supports 514 and 516 across which are cross members in the form of the lower platen 512 and a cross member 518 and a bottom cross member 519. Lower platen 512 and cross member 518 are provided with pairs of registered apertures 520 and 522 through which vertical shafts 524 and 526 slidably pass. The shafts 524 and 526 terminate in bushings 528 and 530 in the bottom cross member 519. The upper ends of the shafts 524 and 526 are connected by screws 532 to the upper platen 510 for movement therewith.

Pivotally secured to the crosspiece 518 are a pair of upper toggle arms 534 which in turn are pivotally secured as by a pivot pin 536 to a pair of lower toggle arms 538 that are pivotally secured to a crosspiece 540. Crosspiece 540 extends between the shafts 524 and 526 and is relatively movable downwardly with respect thereto but is limited in its upper movement by a pair of fixed collars 542. Underlying the crosspiece 540 is a second crosspiece 544 that rests on shoulders 546 and 548 on the shafts 524 and 526 for movement with said shafts. Interposed between the crosspieces 540 and 544 are a plurality of compression springs 550 which bias the crosspieces 544 and 540 away from one another and into respective engagement with the collars 542 and the shoulders 546 and 548. Connected to the center pivot 536 of the toggle is a fixture having an outwardly extending arm 552 on which is disposed a cam follower roller 554 which is in engagement with the periphery of the cam 74 that is mounted on the motor shaft 72. The cam follower has an outwardly extending arm 556 to which is connected a tension spring 558 that has its other end secured suitably to the frame F. The tension spring 558 biases the cam follower 554 into engagement with the periphery of the cam 74. An overcentering restoring spring 560 is disposed between a bar 562 that is fixed to the crosspieces 514 and 516 and a socket 564 in the member 556.

In conventional operation, the toggle is operated by the cam 74 to overcenter to the right once per revolution of the cam whereby to push the lower toggle members 538 downwardly which downward force will be transmitted through the springs 550 to the member 544 and from the member 544 to the shafts 524 and 526 to pull the upper platen 510 down toward the lower platen and thus close to the press. Upon the rise in the cam surface moving away from the cam follower, the restoring spring 560 will push the toggle in the opposite direction (leftward as viewed in FIG. 25) to restore the toggle to its initial condition and thereby raise the upper platen 510. Thereafter the cam follower 554 will continue to follow the cam 74 by means of the spring 558.

In accordance with one feature of the invention, it should be noted that by providing the separate crosspieces 540 and 544 with the interposed compression springs 550 therebetween, means are provided for compensating for the variations which would normally be encountered in the thickness of slides and to prevent undue straining of the press. Thus, for example, if an unduly thick slide is disposed between the platens 510 and 512, and the toggle is operated, it will be obvious that the shafts 524 and 526 could not be moved downwardly due to the thickness of the slidemount. Under those conditions some means of relieving strain must be provided and that means is the split crosspieces with the springs 550 therebetween. Thus, upon encountering an unduly thick slide, as the lower toggle members 538 push down on the crosspiece 540, since the members 524 and 526 cannot move downwardly, the crosspiece 540 will be permitted to move downwardly by the compression springs 550 to relieve the strain on the press.

Rather than employ the press of FIGS. 24 and 25, the slides processed by the present apparatus can be closed by closely confronting rollers that are driven by their own power source. Thus, referring now to FIGS. 26, 27 and 28, a power driven roller mechanism for pressing the slides closed is illustrated. The mechanism comprises a pair of support blocks 600 and 602 which are secured in a suitable fashion to the frame of the machine in the location generally shown for the press 62 which support blocks have extending therebetween a pair of rollers 604 and 606, preferably of steel, which rollers are spaced apart by the thickness of a slide. The rollers 604 and 606 are mounted on the shafts 608 and 610 respectively which shafts have secured thereto spur gears 612 and 614 which are in meshed relation. Also connected in meshed relation with the gear 614 is a gear 616 that is secured to the output shaft 618 of a gear motor 620 which is secured in a suitable fashion (not shown) to the frame or to one or both of the support blocks 600 and 602. With the arrangement as shown in FIG. 27 as described up to this point, it has been found that the slides cannot be brought in between the rollers 604 and 606 as the vacuum pad interferes with the introduction of the mount therebetween. Thus the simple use of a pair of spaced apart rollers 604 and 606 is not satisfactory.

In accordance with the present invention a pair of introductory or guide rollers 622 and 624 are employed to overcome the previously stated problem. Specifically, a rubber roller 622 of approximately the same diameter as the steel rollers 604 and 606 is employed in conjunction with a small idler roller 624 which may be made of a rigid material such as steel. The rubber roller 622 is driven by providing still another gear 626 in meshed relation with the gear 612 which gear 626 is secured to a shaft 628 that extends between the members 600 and 602 and beyond the member 600 whereby to provide a seat for a gear 630. Gear 630 is in meshed relation with a gear 632 that is fixed to a shaft 634 that carries the rubber roller 622. Thus the rubber roller 622 is rotated. The idler roller however is of very small diameter whereby to reduce the interference by the rollers with the movement of the vacuum pad as the vacuum pad moves towards the nip of the rollers. This significant reduction in diameter enables the nip of the rollers to be brought right up against the table top 42 so that as the vacuum pad and pusher dogs move the slide toward the nip of the roller they will be grasped by the nip and advanced through the rollers 622 and 624 and passed on to the pressing rollers 604 and 606 to thereby effect a pressing of the slide.

CONTROL CIRCUITRY

To control the apparatus of the present invention various control means are included. These control means are incorporated in a control circuit arrangement which is diagrammatically illustrated in FIG. 29. Included in the control circuit is a main power switch 700, a jog activate switch 702, a jog reverse switch 704, a jog switch 706, a cam switch 708, a foot switch 709, a pressure plate interlock switch 710, a mount feed interlock switch 712, a mount start switch 714, a fast release control relay 716, a slow release control relay 718, a pair of circuit controlling diodes 720 and 722 and a current limiting resistor 724. In addition to the motor M included in the circuit array, the pump 230 and an indicator lamp 726 are also included as is the electric clutch 136. The ordinary energizing circuit for the motor M is a simple series circuit which may be traced from the power source BX, over contact $a$ of the power switch 700, over the front contact $a$ of the relay 716, through the motor, and over the contact $b$ of the power switch 700 back to the power source. However, in order for this circuit to be closed it is necessary for relay 716 to be energized. Relay 716 may be energized by a first energizing circuit which may be traced from terminal BX of the power source, over contact $a$ of power switch 700, over contact $a$ of the jog activate switch 702, over contact $b$ of the job reverse switch 704, over contact $a$ of foot switch 709, over contact $a$ of pressure plate interlock switch 710, over contact $a$ of mount feed interlock switch 712, through the winding of relay 716, and over contact $b$ of power switch 700 to terminal NX of the power source. This same circuit energizes the control relay 718 in parallel with relay 716 although this has no immediate effect on the circuit.

With the footswitch 709 operated to close its contact $a$, which happens when the operator depresses the foot switch by stepping on it, power is supplied to motor M over the previously traced circuit provided the pressure plate interlock switch 710 is operated to close its contact $a$ and the mount feed interlock switch 712 is operated to close its contact $a$. These two switches 710 and 712 are protective switches to make sure that when the operator operates with the apparatus in the standard fashion that the apparatus is in condition to operate properly. Thus the pressure plate interlock switch 710 is operated to open its contact $a$ and hence open the switch when the pressure plate interlock is pivoted to a raised position as shown in dotted lines in FIG. 22. Since in that position if the machine were operated damage might be done to the film, the pressure plate interlock switch 710 is included to prevent such operation. In FIG. 3 it can be seen that the pressure plate interlock switch operates by means of a feeler 740 which is operatively connected to the spring anchor pin 275 and moves in response to upward pivotal movement of the pressure pad assembly to operate the switch 710 to open its contact $a$ and close its contact $b$.

Also included in the energizing cicuit for the relay 716 and hence establishing a condition for normal operation of motor M is the mount feed interlock switch 712 which provides assurance that a mount is properly located in the receiving or loading station 58 before the apparatus operates. Clearly if film were being fed to the machine and there was no mount present to receive the film the film would be in danger of serious damage. Thus the mount feed interlock switch is provided to sense the presence of a mount and to prevent normal operation of the machine by the foot switch in the event that a mount is not present at the loading station.

The means for activating the switch 712 is illustrated in FIG. 11 wherein an L-shaped feeler rod 750 is slidably disposed under the guiderail 198 for the film and extends to the point in the loading station 58 where the forward end of a mount should be. The vertical portion of the feeler member 750, which portion is designated by the reference numeral 750 engages the actuation member of a limit switch 712 to operate the switch and close contact $a$ thereof when a mount is present. When a mount is not present the spring in the restoring force of the spring 712 is sufficient to push the sensing member 750 to the right as viewed in FIG. 11 and the switch opens itself. This will prevent normal operation.

However, at the outset of a day's run, it is often true that there is no mount at the loading station 58. It is necessary therefor to provide a means for overriding the mount feed interlock switch 712 at the outset of a day's operation in order to introduce the first mount to the machine. This is accomplished by including in parallel with the mount feed interlock switch a pushbutton-type mount start switch 714 which can be employed to initiate the machine's operation by pressing it to cause the machine to introduce a first mount to the loading station 58. When the mount start switch is closed it clearly bypasses the contact a of mount feed interlock switch 712 and thereby energizes relay 716 to cause motor M to operate. It will be seen that whenever the foot switch is in its operated position whereby to close contact a thereof, power is being provided to a full wave rectifier 728 which in turn energizes the magnetic clutch 136 to insure movement of the film feed upon operation of the machine.

Means are provided for assuring that on ordinary operation of the machine (in contrast to jogging operation to be described hereinafter), once the motor is energized, it operates through a full cycle. This prevents the machine from being deenergized halfway through the cycle which would leave the film within the machine which could ultimately result in damage thereto. To accomplish this a second energizing circuit for the relay 716 is provided which will maintain the relay 716 energized until the machine has come to the end of a full cycle. This second energizing circuit for the relay 716 may be traced from the terminal BX of the power source, over contact a of power switch 700, over contact a of job activate switch 702, over contact b of jog reverse switch 704, over contact b of foot switch 709 which has been released to permit it to operate to close contact b, over contact a of cam switch 708 which is closed because the machine is not at the end of its cycle, through the winding of relay 716, and over contact b of power switch 700 to terminal NX. This circuit will maintain relay 716 energized, and hence motor M energized until the apparatus has operated to the completion of a cycle in which position the rack 126 is in its extreme right hand position in which it engages the actuator of the cam switch 708 to operate the cam switch to open its contact a and close its contact b whereby to deenergize relay 716. Upon relay 716 being deenergized the energizing circuit for motor M will be open at contact a of relay 716 which has now opened to thereby cause the motor M to become deenergized. Upon the motor M being deenergized, and contact a of relay 716 opening and contact b closing, a circuit is established for allowing the orderly decay of the field in motor M which circuit may be traced from motor M, through rectifier 722, through current limiting resistor 724, over contact b of slow release control relay 718, over contact b of relay 716 which is now released and back to the motor M. Shortly thereafter, after the field is significantly decayed, the relay 718 will damping circuit for the motor M.

It is often desirable in apparatus of this kind to have the ability to move the apparatus in small increments through its cycle in order to determine if the apparatus is operating properly. Such type of motion is commonly referred to as jogging motion or jogging action and provision for jogging the apparatus of the present invention is included. Specifically, the jogging can be activated or set into action by flipping the toggle switch 702 to open contact a and close contact b whereby to establish an energizing circuit for the motor M that may be traced from the terminal BX, over contact a of power switch 700, over contact b of jog activate switch 702, through pushbutton switch 706, through the windings of motor M, and over contact b of power switch 700 to terminal NX. As jog switch 706 is of the type that is a pushbutton switch normally spring biased to the open position, it may be closed for very brief intervals to briefly energize motor M to advance the machine through its cycle in small increments. In this connection, it should be noted that the cam switch 708 is completely bypassed by the energizing circuit including the jog switch 706 so that the automatic circuit for restoring the apparatus to its start position is ineffective while the apparatus is conditioned for jog operation.

It is also desirable when operating in a jog operation to be able to reverse the direction of operation of the machine in order to cause it to move it backward in small increments to study a particular action of the machine. In order to achieve this triple pole double throw toggle jog reverse switch 704 is included in which the contacts c, d, e and f thereof cooperate to effect a reversal of the energization of the motor as would be well known to those skilled in the art. However, in accordance with one feature of the present invention the third pole of the switch 704 including the contacts a and b are included to insure that the motor M will not be energized in a reverse direction when the jog activate switch 702 is in the position to effect normal operation of the motor through the foot switch 709. This is achieved by utilizing the third pole of the switch 704 as an interlock switch to make sure that the first traced energizing circuit for the motor M including the foot switch 709 must be open if the reverse switch 704 is in its reverse condition. In that condition the contact a is closed and the contact b is open. As the contact a is a dead contact, no energy can be applied to the machine through the normal energizing circuit for the motor M. However, energy can be applied to the machine through the jog circuit including the switch 706. However when the jog reverse switch is in the forward position, contact b of that switch is closed and the footswitch energizing circuits may be employed.

OPERATION

The apparatus of the present invention operates cyclically. Assume that the starting position is the position in which the carriage 60 is in its extreme right hand position as viewed in FIG. 3 and the carriage 64 is in its extreme upper position as viewed in FIG. 3 (which upper position corresponds to the positions shown in FIGS. 15 and 19) and let it further be assumed that the pressure pad assembly is in its dropped or lowered position shown in solid lines in FIG. 22, and let it further be assumed that a slidemount 10 is at the loading station with the lower half thereof folded into a position somewhat beyond the vertical and the upper half being in a horizontal position with a transparency resting thereon, a full cycle will now be traced. In this condition the switch 708 will be open as it has been operated by the rack 126 which is in its extreme right hand position, the mount feed interlock switch 712 is closed due to the presence of a mount 10 at the loading station 58 which mount engages feeler rod 750 to operate switch 712 and the cam high point is out of pressing relation with the toggle of the press 62 whereby to permit the upper platen to be in a raised condition to open the press 62. Upon the depression of the footswitch 708 the main energizing circuit for the relays 716 and 718 including contact *a* of footswitch 709, contact *a* of pressure plate interlock 710, and contact *a* of mount feed interlock switch 712, will be established to energize relays 716 and 718 whereby to close the previously traced normal energizing circuit for the motor M. This will cause the cam 74 and the crank 76 and the connecting rods 78 and 80 to all move whereby to commence moving the carriage 60 to the left to cause the pusher plate 98 to move under the mount holder 50 to push the lowermost mount out from thereunder toward the loading station 58. Simultaneously, carriage 64 will commence moving downwardly and the first thing that will happen will be that the carriage 64, excepting for the pusher rod 238, will commence moving forward to relieve compression on the spring 235 to thereby permit the cam 230 to move away from the camming surface on the vacuum pad 224 and permit the vacuum pad to move downwardly from the position shown in FIG. 19. However, at this time the stop rod 244 is pushed inwardly and engages the ledge 246 on the rear surface of the vacuum pad 224 to hold the vacuum pad in an intermediate position where it can hold the transparency 56 fixed relative to the transparency 10 that is disposed in the loading station 58.

Also at this time the pusher dogs 290 are in their raised position as shown in FIG. 15. Thus downward (as viewed in FIG. 3) movement of carriage 64 will move the slidemount 10 together with the cut transparency disposed thereon at the mounting station 58 toward the open press 62. This same movement will cause the actuator 330 to become disengaged from the depending part 328 of the movable cutter blade 316 whereby to permit the spring 320 that biases that blade to restore the blade to an open position for the next operation of film. Movement of the slidemount and transparency down as viewed in FIG. 3 will cause the upwardly extending portion of the mount to engage arcuate surface 500 on side 194 of the folding apparatus and to commence being folded toward a confronting relation with the transparency. Slightly thereafter the opposite edge of the upstanding portion of the mount will engage the arcuate edge 502 on member 504 to assist in the folding operation.

As the slide and mount initially disposed in the loading station 58 are moving out of the loading station with the mount being folded by such movement, the carriage 60 is moving to the left as viewed in FIG. 3 whereby to have the pusher member engage the lowermost mount in the hopper 50 and commence pushing it out from under the stack towards the loading station. At this time the pivoted folding arm 102 is in a retracted position and the mount is flat. The initial leftward movement of the rack 126 under the impetus of movement of carriage 60 will commence rotating pinion 128 in a clockwise direction. This will have no immediate effect on the film feed mechanism 59 as the pivoted dog 140 on the pinion 128 has a few degrees of travel before it engages one of the pins 148 or 150 on the clutch plate 154 of the mechanical clutch 134. However, after a few degrees of travel, which few degrees provide time for the slide and mount at the loading station 58 to commence moving out before film is once again fed towards the loading station 58, the dog 140 will engage one of the clutch pins 148 or 150 and push the clutch plate 134 in a clockwise direction as viewed in FIG. 3 and in a counterclockwise direction as viewed in FIG. 6 against the pressure of the spring pressed bar 160. This movement will cause the spring pressed bar 160 to move out of engagement with the flat 156 or 158 to free the mechanical clutch member 154 for rotation of approximately 180°. The rotation of the clutch plate 154 is supplied to the electrical clutch 136 which is energized at this time whereby to impart rotation to the shaft 132 to rotate the sprockets 166 and 168 to thereby feed film toward the loading station 58. During the feeding of film toward the loading station and the simultaneous approach of a slidemount 10 towards that station in underlying relation with the film, the initial transparency and mount are approaching the press 62. As they approach the press 62 the actuator bell crank 300 engages the pivoted stop 310 and rides over the stop without interference whereby to keep the pusher dogs 290 in an elevated position pushing the slidemount 10 towards the press. At the same time the vacuum pad 224 is in its intermediate position continuing to hold the transparency on the slide. Finally the slide and transparency enter the press 62 between the fixed and movable platens and at that point member 254 engages stop 256 on the underside of the support plate 42 to push the stop rod 244 to the right against the bias of spring 250 whereby to unlatch the vacuum pad 224 and permit it to return to its lowermost position under the urging of its biasing springs 232.

As the carriage 64 deposits the transparency and slidemount in the press 62 the feed of the film 56 to the right as viewed in FIG. 3 and the feed of the mount 10 to the left as viewed in FIG. 3 to bring them both into superposed relation at the loading station 58 is completed. As previously described, as the mount approaches the loading station 58 it moves under the finger 400 and it commences being folded by the upward movement of the pivoted folding lever 102 which moves into the upwardly extending portion 116 of the cam track 106 as the mount fully moves out from under the hopper 50. By the time the mount reaches the arcuate folding member 190 (FIG. 10) it is in a semifolded position by virtue of the action of the pivoted folding arm 102 and the continued leftward movement of the mount (as viewed in FIG. 3) will cause the arcuate folding member 190 to continue the folding action on the mount until the upstanding portion of the mount has been folded slightly more than 90°. The folding of course is achieved in part by the hold down mechanism illustrated in FIGS. 7, 8 and 9. Simultaneously, the film 56 is being fed one frame length over the guide finger 400 into superposed relation with the underlying slidemount. The carriage 64 commences to move back towards its original position (i.e., upward as viewed in FIG. 3) and the carriage 60 commences moving to its original position (i.e., to the right as viewed in FIG. 3). At this time the cam 74 engages the toggle of the press 62 to overcenter the toggle whereby to depress rods 524 and 526 to close the press and force complementary interengaging means 24–26 into frictional engagement to seal the slide. Continued return movement of the carriage 64 causes the bell shaped actuator member 300 to reengage the pivoted stop 310 and pivot it in a clockwise direction in which it will prevent further movement of the stop 300 until the stop 300 pivots about its pivot 302. This pivotal movement of the actuator 300 will move T-shaped pusher bar 298 to the right as viewed in FIG. 17 to thereby rotate pusher dogs 290 in a counterclockwise direction as viewed in FIG.

17 to render them flush with the table top 42. This will permit continued upward movement of the carriage 64 under the newly located slidemount 10 in the loading position 58. Further upward movement of the carriage 64 will cause the cam block 410 to engage the cam follower roller 408 on plate 404 to pivot the plate 404 about its pivot 406 in a clockwise direction whereby to withdraw rod 402 and thereby move guide finger 400 upwardly as viewed in FIG. 3 to get it out of the way of the apparatus as it functions at this point of the cycle. At about the same time the actuator block 330 on carriage 64 will engage the depending portion 328 of movable cutter bar 316 to swing the cutter bar counterclockwise as viewed in FIG. 23 whereby to cut the positioned frame from the roll of film. Further upward movement of the carriage 64 will bring actuator bar 238 into engagement with block 242 to force vacuum pad 224 towards the cam 230 to raise the vacuum pad to its uppermost position in which it is engaging the bottom surface of the cut film frame. At the same time projection 278 on carriage 64 engages downward projection 272 on the pressure pad assembly to rock supporting member 264 for the pressure pad 260 downwardly whereby to bring the pressure pad into engagement with the upper surface of the film to insure a good vacuum seal between the vacuum pad and the film. Moreover, the slight remaining movement in an upward direction by the carriage 64 will bring the pusher bars 306 into engagement with the plate 242 to push the pusher dogs 290 counterclockwise (see FIG. 15) whereby to recondition the pusher dogs 290 for a subsequent downward movement of the carriage 64. Finally, during the time that all of these events are occurring as a result of the final upward movement of carriage 64, carriage 60 has been moving to the right which movement to the right will restore the pusher plate 98 to the position shown in FIG. 3 to condition it for the next pushing of a slidemount 10 towards loading station 58, and the rack 126 will be restored to its position as shown in FIG. 3 during which restoration it will have been imparting clockwise movement to the pinion 128 which clockwise movement will result in no movement to the shaft 132 but will move the arcuate dog 140 to a position for the actuation of the shaft 132 on the next movement. In this way the mechanism is restored to the initial position and a full cycle has been described.

While I have shown and described the preferred form of the present invention and have suggested modifications therein, other changes and modifications may be made therein within the scope of the appended claims without departing from the spirit and scope of this invention.

I claim:
1. Apparatus for mounting a transparency in a slidemount of the type having a central fold line and two apertures registrable upon the folding of said slidemount along said fold line, said apparatus comprising;
 a table top;
 a hopper on said table top for storing a plurality of superposed slides in stacked relation, said hopper having side wall slots at the bottom thereof to permit the passage of a slide therethrough;
 a slidemount transfer carriage reciprocably movable toward and away from a loading station, said carriage including a pusher movable along said table top through said side wall slots in said hopper for pushing the lowermost slide to said loading station in response to movement of said carriage;
 film supply means;
 film feed means for advancing film along a path above the path of said slidemounts from said film supply means to said loading station, and means connecting said film feed means to said slidemount transfer carriage for operating said film feed means in response to movement of said slidemount transfer carriage to said loading station, whereby a mount and film are fed simultaneously to said loading station.

2. The apparatus of claim 1, further comprising a slide transfer carriage, means for moving said slide transfer carriage in a direction transverse to said movement of said slidemount transfer carriage, said slide transfer carriage including a vacuum pad vertically movable from a first extreme position below said table top to a second extreme position in engagement with said film, means for moving said vacuum pad between said two extreme positions in response to movement of said slide transfer carriage, and means for releasably holding said vacuum pad in a position intermediate said two extreme positions.

3. The apparatus of claim 1, further comprising a slide transfer carriage, means for moving said slide transfer carriage in a direction transverse to said movement of said slidemount transfer carriage, and retractable pusher dogs for pushing a slidemount and transparency away from said loading station, means for retracting said pusher dogs as they approach said loading station, and means for reciprocably projecting said pusher dogs after said pusher dogs have passed under said loading station.

4. The apparatus of claim 2, and retractable pusher dogs for pushing a slidemount and transparency away from said loading station, means for retracting said pusher dogs as they approach said loading station, and means for projecting said pusher dogs after said pusher dogs have passed under said loading station.

5. The apparatus of claim 2, and means for cutting said film, and means for actuating said cutting means in response to said movement of said slide transfer carriage.

6. The apparatus of claim 1, further comprising a pivotally mounted finger disposed on said slidemount transfer carriage adjacent said fold line and pivotally movable from a position below said table top to a position thereabove, and means for pivotally moving said finger in response to movement of said slidemount transfer carriage.

7. The apparatus of claim 2, further comprising a press at one end of the movement of said slide transfer carriage, said press comprising a movable platen, a fixed platen, over centering toggle means for moving said movable platen, and lost motion means interposed between said overcentering toggle and said movable platen.

8. The apparatus of claim 2, further comprising a roller assembly at one end of movement of said slide transfer carriage, said roller assembly comprising a pair of opposed rollers for pressing said slide, and a pair of feed rollers for supplying said slide to said opposed rollers, one of said feed rollers being of relatively large diameter and the other being of small diameter.

9. Apparatus for mounting a transparency in a slidemount of the type having a central fold line and two apertures registrable upon the folding of said slidemount along said fold line, said apparatus comprising:

a table top;

means for supplying slidemounts;

means for transferring said slidemounts from said supply means to a loading station;

film supply means;

film feed means for advancing film along a path above the path of said slidemounts from said film supply means to said loading station, and means connecting said film feed means to said slidemount transfer means for operating said film feed means in timed relation with said slidemount transfer means for feeding a slidemount and said film simultaneously to said loading station for superposing said film on said mount;

means for moving said superposed film and slidemount away from said loading station in a direction transverse to the direction of feed of said film during the feeding thereof, said last mentioned means comprising a vacuum pad vertically movable from a first extreme position below said table top to a second extreme position in engagement with said film, means for moving said vacuum pad between said two extreme positions in response to movement of said means for moving said film and mount away from said loading station, and means for releasably holding said vacuum pad in a position intermediate said two extreme positions.

10. The apparatus of claim 9, wherein said last mentioned means further comprises retractable pusher dogs for pushing a slidemount and transparency away from said loading station, means for retracting said pusher dogs as they approach said loading station, and means for projecting said pusher dogs after said pusher dogs have passed under said loading station.

11. Apparatus for mounting a transparency in a slidemount of the type having a central fold line and two apertures registrable upon the folding of said slidemount along said fold line, said apparatus comprising:

a table top;

means for supplying slidemounts;

means for transferring said slidemounts from said supply means to a loading station;

film supply means;

film feed means for advancing film along a path above the path of said slidemounts from said film supply means to said loading station, and means connecting said film feed means to said slidemount transfer means for operating said film feed means in timed relation with said slidemount transfer means for feeding a slidemount and said film simultaneously to said loading station for superposing said film on said mount;

means for moving said superposed film and slidemount away from said loading station in a direction transverse to the direction of feed of said film during the feeding thereof, said last mentioned means comprising retractable pusher dogs for pushing a slidemount and transparency away from said loading station, means for retracting said pusher dogs as they approach said loading station, and means for projecting said pusher dogs after said pusher dogs have passed said loading station.

12. The apparatus of claim 1, further comprising a pivotally mounted finger disposed on said slidemount transfer carriage adjacent said fold line and pivotally movable from a position below said table top to a position thereabove, and means for pivotally moving said finger in response to movement of said slidemount transfer carriage for folding a portion of the slidemount about its foldline upwardly from said table top; and cam means disposed in the path of movement of said slidemount for engaging said upwardly folded portion and for further upwardly folding it as said slidemount is moved toward said loading station.

13. The apparatus of claim 1, further comprising means for moving said slidemount away from said loading station in a direction transverse to the path of movement of said slidemount to said loading station.

14. The apparatus of claim 2, further comprising means for moving said slidemount away from said loading station in a direction transverse to the path of movement of said slidemount to said loading station, and another camming means disposed in the path of movement of said slidemount away from said loading station for engaging said upwardly folded portion and for folding it into close confronting relation with the other portion of said slidemount as said slidemount is moved away from said loading station.

15. The apparatus of claim 14, further comprising a press in the path of movement of said slidemount away from said loading station, said press comprising a movable platen, a fixed platen, overcentering toggle means for moving said movable platen, and lost motion means interposed between said overcentering toggle and said movable platent for moving said movable platen away from said fixed platen to receive said folded slidemount therebetween and for moving said movable platen toward said fixed platen for pressing a slidemount disposed therebetween.

16. The apparatus of claim 2, further comprising a pressure pad at said loading station above the feed path of said film, and means for moving said pressure pad to and from a raised position above said film feed path and from and to a lowered position where said pressure pad is engageable with said film at said in timed relation with the movement of said vacuum pad so that said pressure pad is lowered when said vacuum pad is raised.

17. The apparatus of claim 9, further comprising a pressure pad at said loading station above the feed path of said film, and means for moving said pressure pad to and from a raised positin above said film feed path and from and to a lowered position where said pressure pad is engageable with said film at said in timed relation with the movement of said vacuum pad so that said pressure pad is lowered when said vacuum pad is raised.

* * * * *